United States Patent
Makida et al.

(10) Patent No.: US 10,142,211 B2
(45) Date of Patent: Nov. 27, 2018

(54) STORAGE MANAGEMENT DEVICE AND CONTROL METHOD

(71) Applicant: FUJITSU LIMITED, Kawasaki-shi, Kanagawa (JP)

(72) Inventors: Toshiharu Makida, Numazu (JP); Kiyoshi Sugioka, Mishima (JP); Sawao Iwatani, Kawasaki (JP); Jouichi Bita, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 559 days.

(21) Appl. No.: 14/469,763

(22) Filed: Aug. 27, 2014

(65) Prior Publication Data
US 2015/0095489 A1    Apr. 2, 2015

(30) Foreign Application Priority Data
Sep. 27, 2013   (JP) ................................. 2013-202653

(51) Int. Cl.
*H04L 9/08*         (2006.01)
*H04L 12/26*        (2006.01)
(Continued)

(52) U.S. Cl.
CPC .......... *H04L 43/0894* (2013.01); *G06F 3/061* (2013.01); *G06F 3/067* (2013.01);
(Continued)

(58) Field of Classification Search
CPC ............. H04L 43/0894; H04L 67/1097; H04L 47/283; G06F 3/061; G06F 3/0631; G06F 3/067; G06F 3/0635; G06F 3/0613
(Continued)

(56) References Cited

U.S. PATENT DOCUMENTS 5,933,604 A  *  8/1999  Inakoshi ............. H04L 12/2602
                                                    709/226
6,651,153 B1    11/2003  Orfali
(Continued)

FOREIGN PATENT DOCUMENTS

EP    1635251 A2    3/2006
EP    2608011 A1    6/2013
(Continued)

OTHER PUBLICATIONS

European Office Action dated Jul. 5, 2016 for corresponding European Patent Application No. 14182297.3, 4 pages.
(Continued)

*Primary Examiner* — Aftab N. Khan
(74) *Attorney, Agent, or Firm* — Fujitsu Patent Center

(57) ABSTRACT

An operation management server that manages a storage apparatus in which volumes are included and data is sent and received via transmission resources is provided. The operation management server includes a setting unit that sets a target value of the performance to some or all of the volumes; a monitoring unit that monitors the load factor of the transmission resources; and a bandwidth management unit that specifies a target transmission resource on the basis of the load factor of the transmission resources, that decides, on the basis of the target value, bandwidth allocation of some of the volumes that use the specified transmission resource, and that instructs a bandwidth control unit in the storage apparatus to adjust the bandwidth on the basis of the decided bandwidth allocation.

15 Claims, 14 Drawing Sheets

(51) Int. Cl.
*G06F 3/06* (2006.01)
*H04L 29/08* (2006.01)

(52) U.S. Cl.
CPC .......... *G06F 3/0631* (2013.01); *G06F 3/0635* (2013.01); *H04L 67/1097* (2013.01)

(58) Field of Classification Search
USPC ........................................................ 709/217
See application file for complete search history.

(56) References Cited

U.S. PATENT DOCUMENTS

| | | | |
|---|---|---|---|
| 7,149,807 B1* | 12/2006 | Kontothanassis | H04L 67/1008 709/224 |
| 7,428,624 B2* | 9/2008 | Fujita | G06F 3/0613 709/213 |
| 7,467,263 B2* | 12/2008 | Ozaki | G06F 3/0613 709/217 |
| 8,040,811 B2* | 10/2011 | Edwards | H04L 41/22 370/241 |
| 8,060,643 B2* | 11/2011 | Messick | H04L 29/06 709/232 |
| 8,131,783 B2* | 3/2012 | Matsuzawa | G06F 12/0223 707/822 |
| 8,234,415 B2* | 7/2012 | Bita | G06F 3/061 710/5 |
| 8,621,178 B1* | 12/2013 | Lazar | G06F 12/0223 711/117 |
| 9,313,274 B2* | 4/2016 | Adriaens | H04L 67/1097 |
| 2001/0029502 A1* | 10/2001 | Oeda | G06F 17/30578 |
| 2002/0004883 A1* | 1/2002 | Nguyen | G06F 3/0613 711/111 |
| 2003/0169688 A1* | 9/2003 | Mott | H04L 12/5695 370/230 |
| 2004/0117369 A1* | 6/2004 | Mandal | G06F 3/0605 |
| 2004/0122938 A1* | 6/2004 | Messick | H04L 47/283 709/224 |
| 2004/0123180 A1* | 6/2004 | Soejima | G06F 11/1096 714/5.1 |
| 2004/0123297 A1 | 6/2004 | Flautner et al. | |
| 2005/0022201 A1 | 1/2005 | Kaneda et al. | |
| 2006/0072608 A1* | 4/2006 | Miyawaki | H04L 67/1097 370/468 |
| 2006/0265608 A1* | 11/2006 | Fung | G06F 1/3203 713/300 |
| 2007/0050684 A1* | 3/2007 | Takaoka | G06F 3/061 714/47.2 |
| 2007/0283107 A1* | 12/2007 | Ozaki | G06F 3/0613 711/154 |
| 2007/0283120 A1* | 12/2007 | Fujita | G06F 3/0613 711/170 |
| 2008/0126734 A1 | 5/2008 | Murase | |
| 2008/0141261 A1* | 6/2008 | Machida | G06F 11/3495 718/104 |
| 2008/0294758 A1* | 11/2008 | Xiao | H04L 12/5695 709/221 |
| 2008/0301164 A1* | 12/2008 | Isobe | G06F 17/30067 |
| 2008/0313641 A1 | 12/2008 | Inoue et al. | |
| 2010/0100604 A1* | 4/2010 | Fujiwara | G06F 12/0866 709/213 |
| 2010/0220510 A1 | 9/2010 | Shalvi | |
| 2012/0027024 A1* | 2/2012 | Liang | H04L 12/4641 370/412 |
| 2012/0166748 A1 | 6/2012 | Satoyama et al. | |
| 2012/0173709 A1* | 7/2012 | Li | G06F 9/5061 709/224 |
| 2012/0278511 A1* | 11/2012 | Alatorre | G06F 3/0605 710/33 |
| 2012/0311602 A1* | 12/2012 | Deguchi | G06F 3/061 718/105 |
| 2013/0151646 A1* | 6/2013 | Chidambaram | H04L 47/6205 709/213 |
| 2013/0159557 A1* | 6/2013 | Bita | G06F 3/0604 710/6 |
| 2013/0204960 A1* | 8/2013 | Ashok | G06F 15/17 709/213 |
| 2013/0232261 A1 | 9/2013 | Wright et al. | |
| 2013/0262649 A1 | 10/2013 | Shimmitsu et al. | |
| 2015/0139108 A1* | 5/2015 | Takano | H04W 16/16 370/329 |
| 2015/0277767 A1* | 10/2015 | Hamano | G06F 3/0665 711/114 |
| 2015/0282175 A1* | 10/2015 | Dai | H04W 28/02 370/329 |

FOREIGN PATENT DOCUMENTS

| | | | | |
|---|---|---|---|---|
| EP | 2854018 A1 * | 4/2015 | | G06F 3/061 |
| JP | 06-250795 | 9/1994 | | |
| JP | 08-255113 | 10/1996 | | |
| JP | 2004-199697 | 7/2004 | | |
| JP | 2005-25422 A | 1/2005 | | |
| JP | 2005-50007 A | 2/2005 | | |
| JP | 2006-108955 | 4/2006 | | |
| JP | 2009-282664 A | 12/2009 | | |
| JP | 2010-097526 | 4/2010 | | |
| JP | 2010-287097 | 12/2010 | | |
| JP | 2013-536478 A | 9/2013 | | |
| JP | 2013-206229 A | 10/2013 | | |
| WO | 03027856 A1 | 4/2003 | | |
| WO | 2012090247 A1 | 7/2012 | | |
| WO | 2013101947 A1 | 7/2013 | | |

OTHER PUBLICATIONS

Extended European Search Report dated Feb. 18, 2015 for corresponding European Patent Application No. 14182297.3, 7 pages.
Japanese Office Action dated Apr. 4, 2017 for corresponding Japanese Patent Application No. 2013-202653, with Partial English Translation, 6 pages.
U.S. Corrected Notice of Allowance dated Jul. 17, 2018 for copending U.S. Appl. No. 14/629,822, 11 pages.
U.S. Non-Final Office Action dated Feb. 9, 2017 for co-pending U.S. Appl. No. 14/629,822, 14 pages.
U.S. Final Office Action dated Aug. 3, 2017 for co-pending U.S. Appl. No. 14/629,822, 10 pages.
Extended European Search Report dated Jul. 15, 2015 for European Patent Application No. 15156570.2, 7 pages.
Japanese Office Action dated Oct. 3, 2017 for Japanese Patent Application No. 2014-066774, with English Translation, 7 pages.
U.S. Notice of Allowance dated Jun. 26, 2018 for copending U.S. Appl. No. 14/629,822, 5 pages.
Extended European Search Report dated Jul. 15, 2015 for corresponding European Patent Application No. 15156570.2, 7 pages.
Japanese Office Action dated Oct. 3, 2017 for corresponding Japanese Patent Application No. 2014-066774, with English Translation, 7 pages.
U.S. Corrected Notice of Allowance dated Aug. 30, 2018 for copending U.S. Appl. No. 14/629,822, 6 pages.

* cited by examiner

| VOLUME IDENTIFICATION INFORMATION | PROCESSING PROCESSOR | PORT NUMBER | SWITCH PORT | RAID GROUP |
|---|---|---|---|---|
| Storage=1, VolNo=1 | CM#0 | CA#0, Port#0 | SW#0, Port#0 | RAIDG_1 |
| Storage=1, VolNo=2 | CM#0 | CA#1, Port#1 | SW#0, Port#1 | RAIDG_2 |
| Storage=2, VolNo=1 | CM#1 | CA#0, Port#1 | SW#1, Port#1 | RAIDG_3 |
| Storage=2, VolNo=2 | CM#1 | CA#0, Port#2 | SW#0, Port#1 | RAIDG_3 |

| PERFORMANCE MEASUREMENT DATE AND TIME | VOLUME IDENTIFICATION INFORMATION | MEASURED RESPONSE TIME | MEASURED THROUGHPUT | MEASURED IOPS | MEASURED CACHE HIT RATE | MEASURED DELAY TIME |
|---|---|---|---|---|---|---|
| 20110101000000-20110101000030 | Storage=1, VolNo=1 | 10 ms | 12 MB/s | 100 IOPS | 10% | 0 ms |
| 20110101000000-20110101000030 | Storage=1, VolNo=2 | 11 ms | 9 MB/s | 100 IOPS | 9% | 1 ms |
| 20110101000000-20110101000030 | Storage=2, VolNo=1 | 12 ms | 8 MB/s | 100 IOPS | 8% | 2 ms |
| 20110101000000-20110101000030 | Storage=2, VolNo=2 | 13 ms | 7 MB/s | 100 IOPS | 7% | 3 ms |
| 20110101000030-20110101000100 | Storage=1, VolNo=1 | 11 ms | 11 MB/s | 110 IOPS | 10% | 0 ms |
| 20110101000030-20110101000100 | Storage=1, VolNo=2 | 12 ms | 10 MB/s | 120 IOPS | 9% | 1 ms |
| 20110101000030-20110101000100 | Storage=2, VolNo=1 | 13 ms | 9 MB/s | 130 IOPS | 8% | 2 ms |
| 20110101000030-20110101000100 | Storage=2, VolNo=2 | 14 ms | 8 MB/s | 140 IOPS | 7% | 3 ms |

| PERFORMANCE MEASUREMENT DATE AND TIME | RESOURCE TYPE | RESOURCE IDENTIFICATION INFORMATION | BUSY RATE |
|---|---|---|---|
| 20110101100000-20110101000030 | PROCESSING PROCESSOR | Storage=1, CM#0 | 10% |
| 20110101100000-20110101000030 | PORT | CA#0, Port#0 | 9% |
| 20110101100000-20110101000030 | SWITCH PORT | SW#0, Port#0 | 8% |
| 20110101100000-20110101000030 | RAID GROUP | Storage=1, RAID_1 | 7% |
| 20110101000030-20110101000100 | PROCESSING PROCESSOR | Storate=1, CM#0 | 10% |
| 20110101000030-20110101000100 | PORT | CA#0, Port#0 | 9% |
| 20110101000030-20110101000100 | SWITCH PORT | SW#0, Port#0 | 8% |
| 20110101000030-20110101000100 | RAID GROUP | Storage=1, RAIDG_1 | 7% |

| HBA ON SERVER SIDE | STORAGE | PROCESSING PROCESSOR | PORT NUMBER | MANAGEMENT GROUP |
|---|---|---|---|---|
| CM#0 | Storage#1 | CM#0 | CA#0, Port#0 | GROUP#1 |
| CM#0 | Storage#1 | CM#0 | CA#1, Port#1 | GROUP#1 |
| CM#1 | Storage#1 | CM#1 | CA#0, Port#1 | GROUP#4 |
| CM#1 | Storage#2 | CM#1 | CA#0, Port#2 | GROUP#4 |

| MANAGEMENT GROUP | VOLUME IDENTIFICATION INFORMATION |
|---|---|
| GROUP#1 | Storage=1, VolNo=1 |
| GROUP#1 | Storage=1, VolNo=2 |
| GROUP#4 | Storage=2, VolNo=1 |
| GROUP#4 | Storage=2, VolNo=2 |

147

STORAGE MANAGEMENT DEVICE AND CONTROL METHOD

CROSS-REFERENCE TO RELATED APPLICATION

This application is based upon and claims the benefit of priority of the prior Japanese Patent Application No. 2013-202653, filed on Sep. 27, 2013, the entire contents of which are incorporated herein by reference.

FIELD

The embodiments discussed herein are related to a storage management device, a control method, and a control program.

BACKGROUND

In recent years, with the virtualization of open systems and servers, management of systems is becoming complicated. Consequently, using storage systems becomes common in terms of easily managing the systems or flexibly coping with a rapid increase in an amount of data.

In the storage systems, for example, performance adjustment of the storage systems is performed by adjusting the limit width of a bandwidth of a data transfer path between a volume and a server that executes an application. In a conventional technology, adjustment of the limit width of a bandwidth is performed by a storage system that receives an instruction from an administrator.

Furthermore, the following technology has been proposed as a method of adjusting the performance of storage systems. For example, there is a conventional technology that adjusts, by setting a target value from among a copying speed of the background, the completion time of the copying, and the response time received from front business, the parameter of another process in order to implement the target operation. Furthermore, there is a conventional technology that adjusts the cache size such that the response time is converged to a target value. Furthermore, there is a conventional technology that adjusts, by using a function of a fibre channel switch, a bandwidth that is allocated to an application when a set condition is satisfied. Furthermore, there is a conventional technology that equally allocates the usage rate of a line by adjusting a bandwidth and then cancels out the imbalance of the performance.

Patent Document 1: Japanese Laid-open Patent Publication No. 06-250795
Patent Document 2: Japanese Laid-open Patent Publication No. 2010-097526
Patent Document 3: Japanese Laid-open Patent Publication No. 2004-199697
Patent Document 4: Japanese Laid-open Patent Publication No. 2006-108955

However, when a single transmission path is shared by multiple volumes, conflict occurs in data transfer and thus it is difficult to implement the target performance. Accordingly, in order to implement the target performance, an administrator specifies a volume in which the data transfer conflicts by monitoring the operation state and then instructs a storage system to reduce the limit width of the bandwidth of a volume from among the multiple volumes. Then, the storage system reduces the bandwidth of the volume in accordance with the instruction from the administrator.

However, multiple transmission resources that cause a reduction in the performance are present in a path from the application to the volume. Example of these resources include Redundant Array of Inexpensive Disks (RAID) groups, processing processors, ports, switch ports, or the like. The volumes that share the resources differ for resources. Accordingly, in the conventional method in which an administrator instructs a storage system to adjust the limit width of the bandwidth, the administrator specifies the resource in which conflict occurs and determines a method of adjusting the limit width of the bandwidth of the volumes that share the specified resource. Specifically, in the conventional method, the process is complicated for an administrator and it is difficult to easily adjust the performance of a storage system.

Furthermore, with the conventional technology that adjusts a copying speed, the completion time of the copying, or the parameter of the front business or with the conventional technology that adjusts the cache size, the adjustment of the limit width of the bandwidth is not taken into consideration; therefore, it is difficult to easily adjust the performance of a storage system by using the limit width of the bandwidth. Furthermore, with the conventional technology that adjusts the bandwidth that is allocated to an application by using the function of a fibre channel switch, the load of each of the resources is not taken into consideration; therefore, it is difficult to adjust the limit width of an appropriate bandwidth. Furthermore, with the conventional technology that adjusts the bandwidth and cancels out the imbalance of the performance, the performance of a storage system is not able to be improved by adjusting the limit width of the bandwidth; therefore, it is difficult to easily adjust the performance of a storage system by using the limit width of the bandwidth.

SUMMARY

According to an aspect of an embodiment, a storage management device manages a storage device in which a plurality of storing units are included and data is sent and received via transmission resources. The storage management device includes: a setting unit that sets a target value of the performance to some or all of the storage units; a monitoring unit that monitors the load factor of the transmission resources; and a bandwidth management unit that specifies a target transmission resource on the basis of the load factor of the transmission resources, that decides, on the basis of the target value, bandwidth allocation of some of the storage units that use the specified transmission resource, and that instructs a bandwidth limiting unit in the storage apparatus to adjust the bandwidth on the basis of the decided bandwidth allocation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a schematic diagram illustrating an example of a volume table;

FIG. 6 is a schematic diagram illustrating an example of a volume performance information file;

FIG. 7 is a schematic diagram illustrating an example of a resource performance information file;

FIG. 12 is a schematic diagram illustrating an example of a management group specification table;

DESCRIPTION OF EMBODIMENTS

Preferred embodiments of the present invention will be explained with reference to accompanying drawings. The storage management device, the control method, and the control program disclosed in the present invention are not limited to the embodiments described below.

[a] First Embodiment

Figure 1:
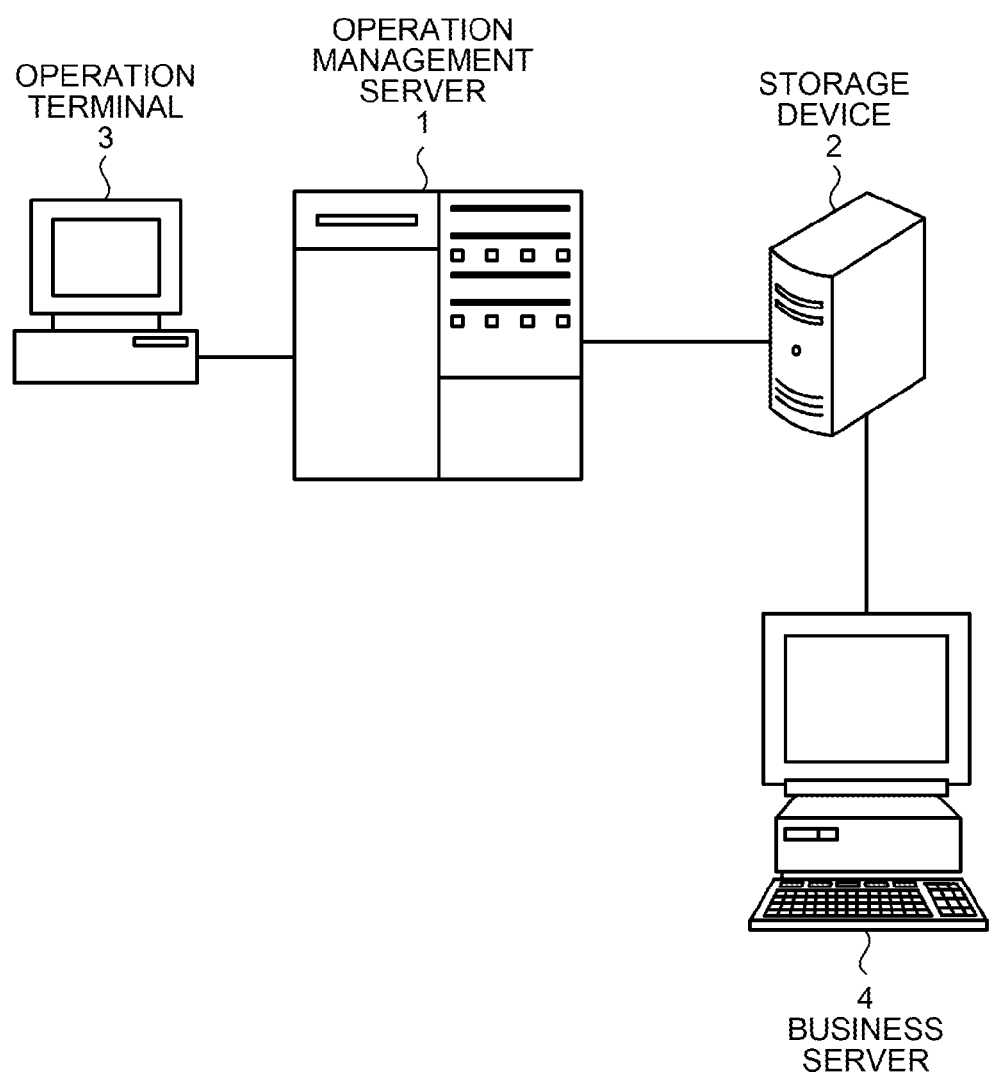
FIG. 1 is a schematic diagram illustrating, in outline, the configuration of a storage system according to a first embodiment.

FIG. 1 is a schematic diagram illustrating, in outline, the configuration of a storage system according to a first embodiment. As illustrated in FIG. 1, the storage system according to the first embodiment includes an operation management server 1, a storage device 2, an operation terminal 3, and a business server 4. FIG. 1 illustrates the single storage device 2; however, the number of the storage devices 2 is not limited. Furthermore, only the single business server 4 illustrated in FIG. 1; however, the number of the business servers 4 is not also limited.

The operation terminal 3 is connected to the operation management server 1 via a network. The operation terminal 3 sends an instruction of a process to be performed on the storage device 2 to the operation management server 1. Furthermore, the operation terminal 3 displays, for example, a message sent from the operation management server 1 on a monitor and notifies an operator of the message.

The operation management server 1 operates and manages the storage device 2. The operation management server 1 executes a Quality of Service (QoS) control program or a storage management program. The operation management server mentioned here corresponds to an example of a "management device".

Specifically, the operation management server 1 performs QoS control in the storage device 2. The QoS mentioned here is a performance setting function that is used for the storage device 2 to maintain the stable performance and that is adjustment of a volume bandwidth or the like, which will be described later. Furthermore, the operation management server 1 controls the storage device 2 in accordance with the instruction that is input from the operation terminal 3. For example, the operation management server 1 sends, to the storage device 2, an instruction to configure the RAID that is input from the operation terminal 3.

In response to receiving an instruction from an application that is running on the business server 4, the storage device 2 reads or writes data by using QoS. Furthermore, in response to receiving an instruction from the operation management server 1 indicating, for example, the adjustment of the bandwidth of a volume, the storage device 2 controls the QoS.

The business server 4 executes a business application. When the business server 4 executes the application, the business server 4 reads or writes data from or to the storage device 2. The application executed by the business server 4 is not particularly limited as long as the application that sends and receives data to and from the storage device 2.

Figure 2:
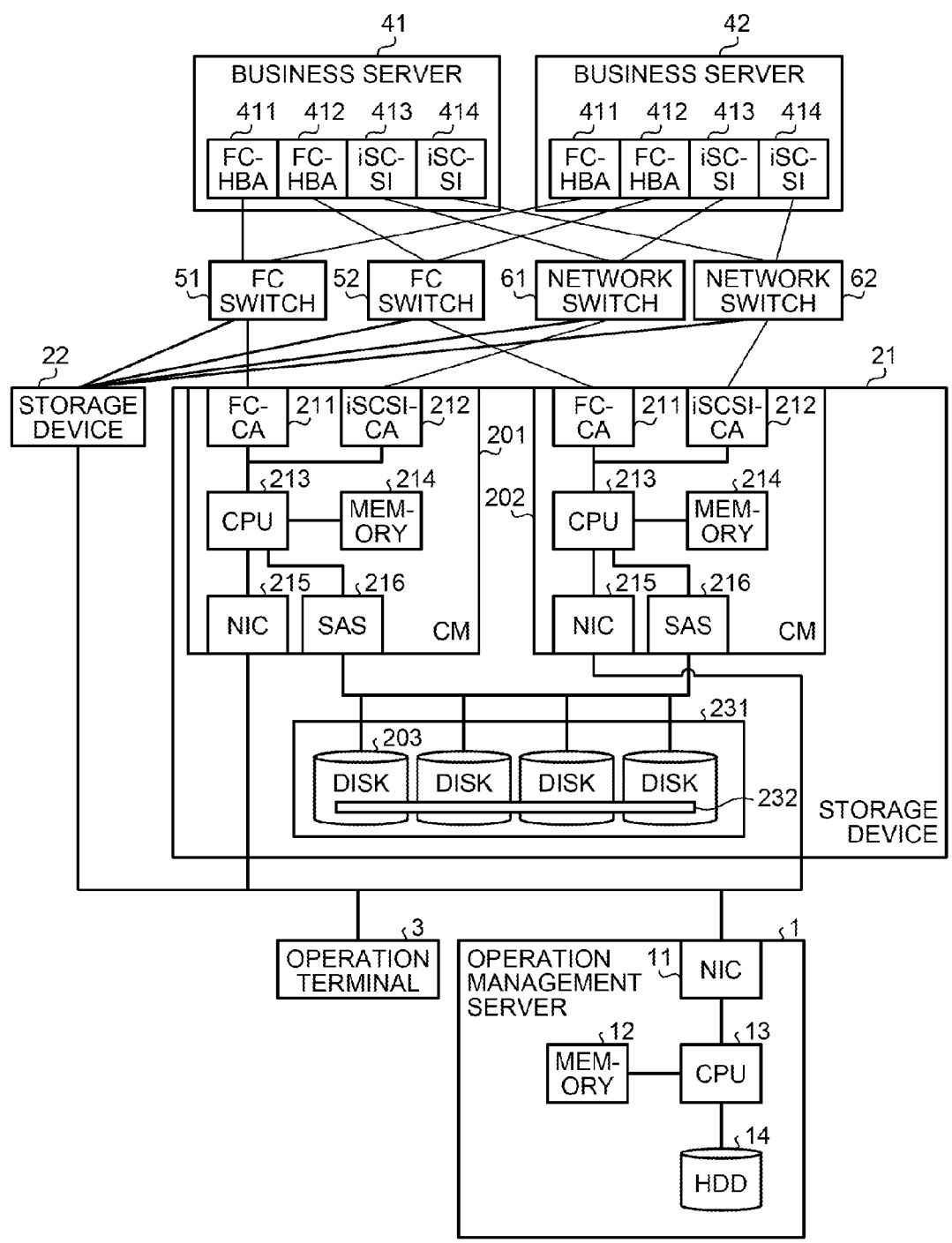
FIG. 2 is a schematic diagram illustrating the hardware configuration of the storage system.

FIG. 2 is a schematic diagram illustrating the hardware configuration of the storage system. FIG. 2 illustrates the state in which storage devices 21 and 22 are arranged as the storage device 2. Furthermore, FIG. 2 illustrates the state in which business servers 41 and 42 are arranged as the as the business server 4.

Because the business server 41 and the business server 42 have the same configuration, the business servers 41 and 42 are simply referred to as the "business server 4" as long as the business servers 41 and 42 need not be distinguished. Furthermore, because the storage device 21 and the storage device 22 have the same configuration, the storage devices 21 and 22 are simply referred to as the "storage device 2" as long as the storage devices 21 and 22 need not be distinguished.

The business server 4 includes fiber channel-host bus adapters (FC-HBAs) 411 and 412 and internet small computer system interfaces (iSCSIs) 413 and 414. In the first embodiment, the number of the FC-HBAs 411 and 412 is two; however, an arbitrary number of FC-HBAs may also be installed in the business server 4. Furthermore, the number of the iSCSIs 413 and 414 is two; however, an arbitrary number of iSCSIs may also be installed in the business server 4.

The FC-HBAs 411 and 412 are communication interfaces for data communication using a fibre channel. The FC-HBAs 411 and 412 are connected to FC switches 51 and 52, respectively.

The iSCSIs 413 and 414 are communication interfaces for data communication conforming to the iSCSI standard. The iSCSIs 413 and 414 are connected to network switches 61 and 62, respectively.

The FC switches 51 and 52 relay communication between the storage device 2 and the business server 4 performed by using a fibre channel. The FC switches 51 and 52 connect the FC-HBAs 411 and 412 and FC-channel adapters (CAs) 211, respectively.

The network switches 61 and 62 relay communication between the storage device 2 and the business server 4 performed by using iSCSI. The network switches 61 and 62 connect the iSCSIs 413 and 414 and iSCSI-CAs 212, respectively.

The storage device 2 includes controller modules (CMs) 201 and 202 and disk devices 203.

The CMs 201 and 202 have the same configuration. Accordingly, in the following, a description will be given of the CM 201 as an example.

The CM 201 includes the FC-CA 211, the iSCSI-CA 212, a central processing unit (CPU) 213, a memory 214, a network interface card (NIC) 215, and a serial attached SCSI (SAS) 216.

The FC-CA 211, the iSCSI-CA 212, the memory 214, the NIC 215, and the SAS 216 are connected to the CPU 213.

The CPU 213 sends and receives data to and from the business server 4 via the FC-CA 211 and the iSCSI-CA 212.

Furthermore, the CPU 213 performs the reading and the writing of data with respect to the disk devices 203 via the SAS 216.

Furthermore, the CPU 213 communicates with the operation terminal 3 and the operation management server 1 via the NIC 215. For example, when the CPU 213 receives an instruction to adjust the bandwidth from the operation management server 1, which will be described later, the CPU 213 adjusts the bandwidth of the disk device 203 in accordance with the instruction.

The multiple disk devices 203 are installed in the storage device 2. In FIG. 2, a RAID group 231 is constituted by the multiple disk devices 203. However, the number of the disk devices 203 is not limited to the first embodiment. For example, it is allowable that a RAID group is not constituted by the disk devices 203. Furthermore, storage areas of the RAID group 231 are allocated to storage area of volumes 232. The volumes 232 are logical volumes.

In the following, a description will be given of the writing and the reading of data performed by the CPU 213. The CPU 213 receives, from a business application running on the business server 4, a read command that is an instruction to read data or a write command that is an instruction to write data. At this point, the read command or the write command is sent to the CPU 213 via, for example, the port of the FC switch 51 and the port of the FC-CA 211. Then, the CPU 213 performs the reading or the writing of data with respect to the volumes 232 in the disk device 203 in accordance with the received command. At this point, the data is written or read into or from the volumes 232 in accordance with the configuration of the RAID group 231. Furthermore, a description has been given of a case in which the CPU 213 in the CM 201 reads and writes data; however, the same process is also performed in the CPU 213 in the CM 202.

Specifically, in data transfer in which data is written or read, conflict occurs in a port of the FC switch 51, in a port of the FC-CA 211 or the iSCSI-CA 212, in the CPU 213 that is the processing processor that performs a process on the data, and in the RAID group 231. In a description below, the port of the FC switch 51, the port of the FC-CA 211 or the iSCSI-CA 212, the CPU 213 corresponding to the processing processor that performs a process on the data, and the RAID group 231 may sometimes be collectively referred to as a "resource". A resource in which conflict occurs is an example of the "transmission resource".

If conflict occurs in each of the resources when data transfer is performed, the performance of the data transfer is reduced. Accordingly, in a transmission path that uses the resources in which conflict occur, by adjusting the bandwidth of one of the volumes 232 that uses the transmission path, the conflict occurring in the resources can be eliminated, thus the performance of the data transfer can be maintained in a high state. Accordingly, in the following, a description will be given of the adjustment of the bandwidth of the volumes 232.

The operation management server 1 includes an NIC 11, a memory 12, a CPU 13, and a hard disk drive (HDD) 14. The NIC 11, the memory 12, and the HDD 14 are connected to the CPU 13 via a bus.

Figure 3:
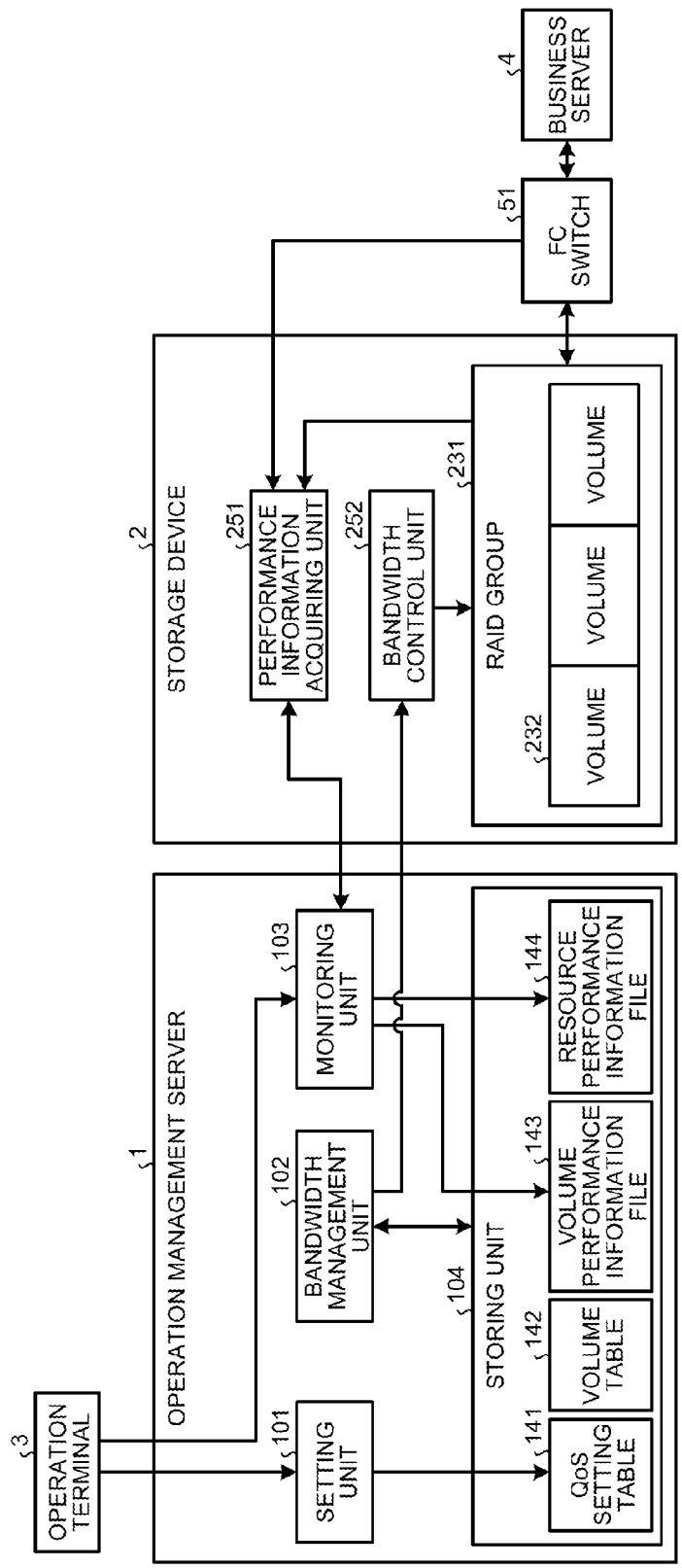
FIG. 3 is a block diagram illustrating an operation management server and a storage device according to the first embodiment.

FIG. 3 is a block diagram illustrating an operation management server and a storage device according to the first embodiment. The operation management server 1 includes a setting unit 101, a bandwidth management unit 102, a monitoring unit 103, and a memory unit 104. Furthermore, the storage device 2 includes a performance information acquiring unit 251 and a bandwidth control unit 252.

The memory unit 104 includes a QoS setting table 141, a volume table 142, a volume performance information file 143, and a resource performance information file 144. The function of the memory unit 104 is implemented by, for example, the HDD 14 illustrated in FIG. 2.

Figure 4:
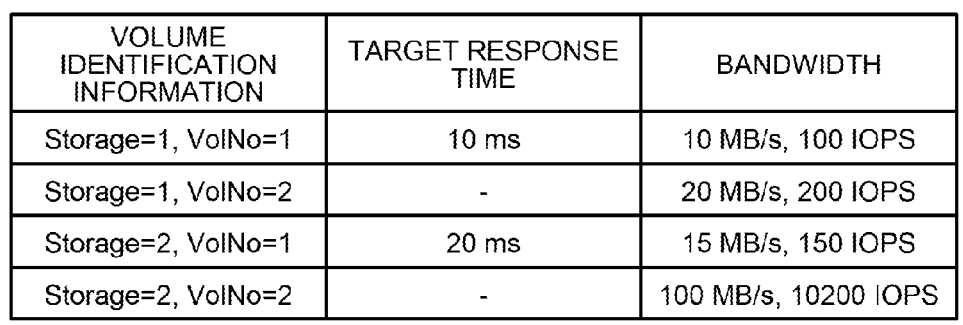
FIG. 4 is a schematic diagram illustrating an example of a QoS setting table.

FIG. 4 is a schematic diagram illustrating an example of a QoS setting table. Volume identification information is information for uniquely specifying the volumes 232. In the first embodiment, in the QoS setting table 141, the volume identification information, the target response time, and the bandwidth are registered in an associated manner.

In the first embodiment, the volume identification information is represented by a storage device number and a volume number. For example, if the storage device number of the storage device 21 illustrated in FIG. 2 is 1 and the storage device number of the storage device 22 is No. 2, "Storage=1, VolNo=1" indicates that the storage device 21 with the storage device number of 1 represents the volume 232 with volume number of 1.

Furthermore, the target response time is a response time for the target volume that includes the associated volume identification information. If the target response time is not set, a symbol that indicates a blank field is represented in the item of the target response time.

Furthermore, the bandwidth is a bandwidth that is set in a volume that includes the associated volume identification information. In FIG. 4, the bandwidth is represented by two types, i.e., the amount of data per second (MB Per Second) that represents the throughput and input/output per second (IOPS).

FIG. 5 is a schematic diagram illustrating an example of a volume table. In the volume table 142 in the first embodiment, volume identification information, a processing processor, a port number, a switch port, and a RAID group are registered in an associated manner.

The volume table 142 represents the resource used by each of the volumes 232. Specifically, each of the volumes 232 indicated by the volume identification information uses the processing processor, the port number, the switch port, and the RAID group that are associated each other in the volume table 142.

In FIG. 5, a processing processor is represented by the number that is allocated to a CM on which the processing processor is mounted. For example, when the CM 201 illustrated in FIG. 2 is a "CM#0" and the CM 202 illustrated in FIG. 2 is a "CM#1", the CPU 213 in the CM 201 is represented by the CM#0 and the CPU 213 in the CM 202 is represented by the CM#1.

Furthermore, the port number is represented by the information that indicates the FC-CA 211 or the iSCSI-CA 212 and is represented by the information on the port thereof. For example, it is assumed that the FC-CA 211 is "CA#0" and the iSCSI-CA 212 is "CA#1". In such a case, for example, "CA#0, Port#0" indicates the port with the port number of zero in the FC-CA 211.

Furthermore, the switch port is represented by the information indicating the FC switch 51 or 52 or the network switch 61 or 62 and is represented by the information of the port thereof. For example, it is assumed that the FC switch 51 is a "SW#0", it is assumed that the FC switch 52 is a "SW#1", it is assumed that the network switch 61 is a "SW#2", and it is assumed that the network switch 62 is a "SW#3". In such a case, for example, "SW#0, Port#0" indicates the port with the port number of zero in the FC switch 51.

Furthermore, the RAID group is represented by the identification information that is previously allocated to each of the RAID groups 231.

For example, the volume 232 that includes the volume identification information indicated by "Storage=1, VolNo=1" performs data transfer by using the CPU 213, using the port with the port number of zero in the FC-CA 211, using the port with the port number of zero in the FA switch 51, and using the RAID group 231 indicated by RAIDG_1.

Because the transmission path that is used by each of the volumes 232 is previously determined, the resource that is to be used and that is arranged on the transmission path can be specified. Thus, the volume table 142 is previously registered.

FIG. 6 is a schematic diagram illustrating an example of a volume performance information file. The volume performance information file 143 indicates the actual performance of each of the volumes 232. In the volume performance information file 143 in the first embodiment, the performance measurement date and time at which the measurement is performed, volume identification information, the measured response time, the measured throughput, the measured IOPS, the measured cache hit rate, and the measured delay time are registered in an associated manner. In a description below, the volume identification information, the measured response time, the measured throughput, the measured IOPS, the measured cache hit rate, and the measured delay time may sometimes be collectively referred to as "performance information on a volume".

The measured response time is the response time measured when data is read and written from and to one of the volumes 232 that includes the associated volume identification information. The measured throughput is the throughput measured when data is read and written from and to one of the volumes 232 that includes the associated volume identification information. The measured IOPS is the IOPS measured when data is read and written from and to one of the volumes 232 that includes the associated volume identification information. The measured cache hit rate is the cache hit rate measured when data is read and written from and to one of the volumes 232 that includes the associated volume identification information. The measured delay time is the delay time measured when data is read and written from and to one of the volumes 232 that includes the associated volume identification information.

FIG. 7 is a schematic diagram illustrating an example of a resource performance information file. The resource performance information file 144 indicates the actual performance of each of the resources. In the resource performance information file 144 in the first embodiment, the performance measurement date and time at which the measurement is performed, the resource type, the resource identification information, and the busy rate are registered in an associated manner.

The resource identification information is information for uniquely specifying a resource. The resource type is the type of the resource that is specified by resource identification information. The busy rate is the load factor of the resource that is specified by resource identification information.

A description will be given here by referring back to FIG. 3. The setting unit 101 receives, from the operation terminal 3, a target value, such as the target response time, of one of the volumes 232 that is input by an operator. Then, the setting unit 101 registers, in the QoS setting table 141, the target response time with respect to the specified volume 232.

The monitoring unit 103 receives, from the operation terminal 3, an instruction received from an operator indicating the starting of the performance collection. Then, the monitoring unit 103 starts to periodically receive the performance information on a volume and a resource from the performance information acquiring unit 251. Then, the monitoring unit 103 writes the received performance information on each of the volumes 232 into the volume performance information file 143. Furthermore, the monitoring unit 103 writes the received performance information on the resource into the resource performance information file 144.

The bandwidth management unit 102 specifies, from the QoS setting table 141, one of the volumes 232 in which the target response time is set. In a description below, the volume 232 in which the target response time is set is referred to as a "target set volume". Furthermore, the volume in which the target response time is not set is referred to as a "non-target set volume".

The bandwidth management unit 102 selects one of the target set volumes. In a description below, the selection of a target set volume is referred to as a "first selection". Then, the bandwidth management unit 102 acquires information on the resources that are used by the selected target set volume from the volume table 142. Furthermore, the bandwidth management unit 102 acquires the busy rate of each of the acquired resources from the resource performance information file 144. Then, the bandwidth management unit 102 specifies the resource with the highest busy rate from among the resources that are used by the selected target set volume.

The bandwidth management unit 102 specifies, by using the volume table 142, the volumes 232 that share the resource that has the highest busy rate from among the resources that are used by the selected target set volumes. The specified volumes 232 are referred to as "shared volumes".

The bandwidth management unit 102 selects one of the target set volumes from among the shared volumes. In a description below, a selection of a target set volume is referred to as a "second selection". Then, the bandwidth management unit 102 acquires the measured response time of the selected target set volume from the volume performance information file 143. Furthermore, the bandwidth management unit 102 acquires the target response time of the selected target set volume from the QoS setting table 141. Then, the bandwidth management unit 102 compares the measured response time of the selected target set volume with the target response time of the selected target set volume.

If the target response time is shorter than the measured response time, the bandwidth management unit 102 reserves an expansion of the bandwidth of the selected target set volume. Furthermore, the bandwidth management unit 102 reserves a reduction of the bandwidth of the non-target set volume from among the shared volumes.

In contrast, if the target response time is longer than the measured response time, the bandwidth management unit 102 reserves a reduction of the bandwidth of the selected target set volume. Furthermore, the bandwidth management unit 102 reserves an expansion of the bandwidth of the non-target set volume from among the shared volumes.

The bandwidth management unit 102 reserves, for all of the set volumes included in the shared volumes, the second selection of the target set volume from the shared volumes and the adjustment of the bandwidth that is subsequently used.

Furthermore, for all the target set volumes, the bandwidth management unit 102 performs the first selection, specifies the subsequently used shared volumes, and reserves the second selection and the adjustment of the bandwidth.

Then, the bandwidth management unit 102 decides the adjustment of the bandwidth of each of the volumes 232 from the reservation of the adjustment that has been performed on each of the volume 232. For example, the bandwidth management unit 102 calculates the sum total of the adjustment of each of the volumes 232 by incrementing by one when an expansion is reserved and by decrementing by one when a reduction is reserved, where the initial value is zero. If the result of the sum total is a positive value, the bandwidth management unit 102 decides to expand the bandwidth of the corresponding volumes 232. In contrast, if the result of the sum total is a negative value, the bandwidth management unit 102 decides to reduce the bandwidth of the corresponding volumes 232.

Then, the bandwidth management unit 102 notifies the bandwidth control unit 252 of the adjustment of the bandwidth of each of the decided volumes 232. Specifically, the bandwidth management unit 102 sends, to the storage device 2, a set command that is used to increase or reduce the bandwidth of each of the volumes 232.

The functions performed by the setting unit 101, the bandwidth management unit 102, and the monitoring unit 103 are implemented by, for example, the CPU 13 and the memory 12 illustrated in FIG. 2. For example, the HDD 14 stores therein various programs that are used to implement the functions performed by the setting unit 101, the bandwidth management unit 102, and the monitoring unit 103. Then, the CPU 13 reads the various programs from the HDD 14; loads processes that implement the functions performed by the setting unit 101, the bandwidth management unit 102, and the monitoring unit 103 in the memory 12; then executes the processes.

The performance information acquiring unit 251 receives, from the monitoring unit 103, an instruction to start the performance collection. Then, the performance information acquiring unit 251 periodically acquires performance information on each of the volumes 232 and sends the acquired performance information to the monitoring unit 103. Furthermore, the performance information acquiring unit 251 periodically acquires performance information on each of the resources and sends the acquired performance information to the monitoring unit 103. In the first embodiment, FIG. 3 illustrates, as an example of acquiring the performance information on a resource, acquisition of the performance information received from the RAID group 231 and the FC switch 51 performed by the performance information acquiring unit 251.

The bandwidth control unit 252 receives, from the bandwidth management unit 102, a set command for expanding or reducing the bandwidth. Then, in accordance with the specified set command, the bandwidth control unit 252 expands or reduces the bandwidth of the volumes 232 specified by each set command.

Figure 8:
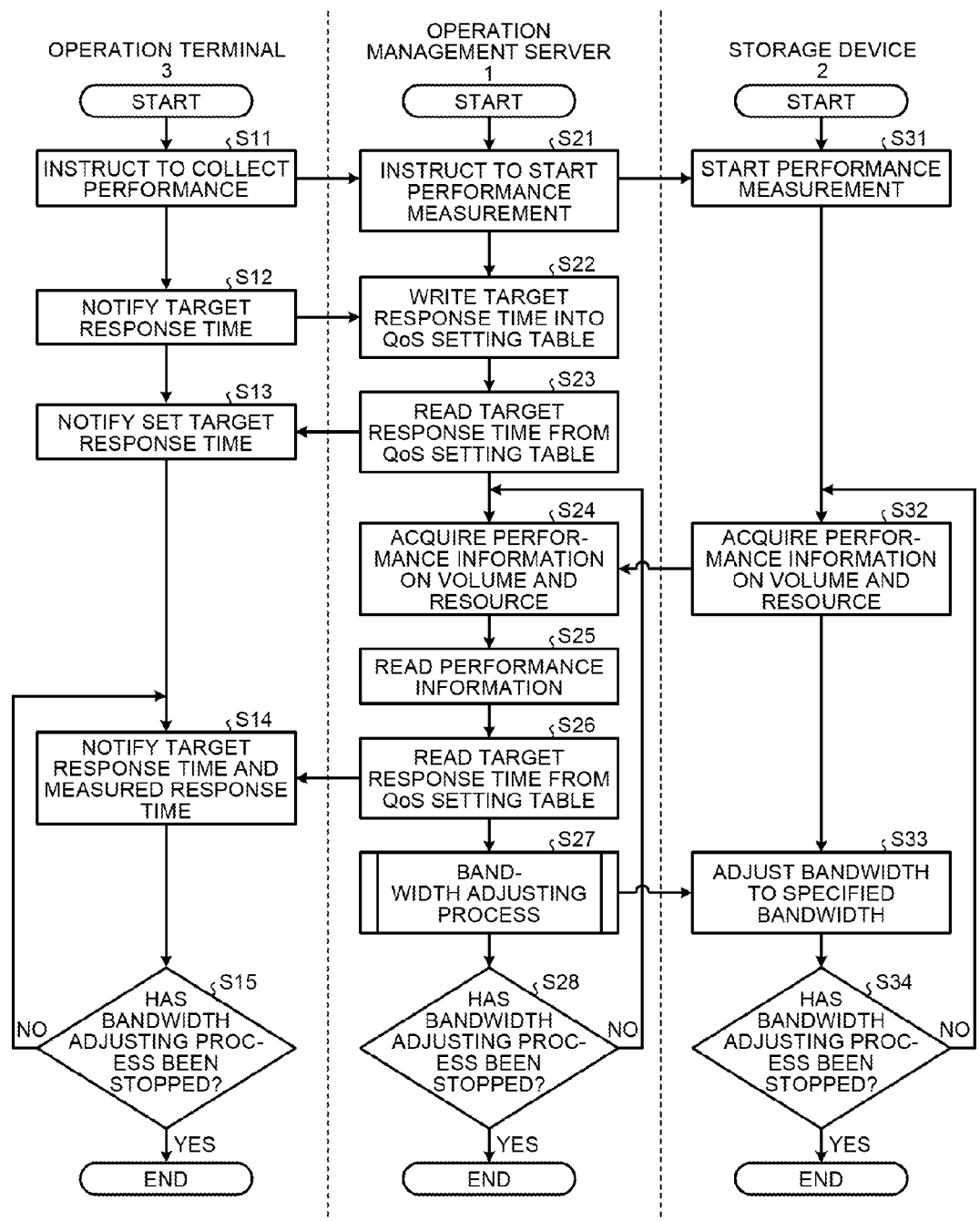
FIG. 8 is a flowchart illustrating the flow of bandwidth control performed by the storage system according to the first embodiment.

In the following, the flow of bandwidth control performed in the storage system according to the first embodiment will be described with reference to FIG. 8. FIG. 8 is a flowchart illustrating the flow of bandwidth control performed by the storage system according to the first embodiment. The flow on the left side illustrated in FIG. 8 indicates the process performed by the operation terminal 3. The flow in the middle of FIG. 8 indicates the process performed by the operation management server 1. The flow on the right side illustrated in FIG. 8 indicates the process performed by the storage device 2. The arrow that connects each flow indicates that an instruction or data is sent in the direction of the arrow.

In response to an instruction from an operator, the operation terminal 3 instructs the monitoring unit 103 in the operation management server 1 to perform the performance collection (Step S11).

Furthermore, in response to an instruction from an operator, the operation terminal 3 notifies the setting unit 101 in the operation management server 1 of the target response time and instructs the setting unit 101 to set the target response time (Step S12).

Then, the operation terminal 3 receives the information on the set target response time from the setting unit 101. Then, the operation terminal 3 notifies the operator of the set target response time by displaying the target response time on a monitor or the like (Step S13). The operator checks the set target response time.

Then, the operation terminal 3 receives, from the bandwidth management unit 102 in the operation management server 1, the target response time and the measured response time. Then, the operation terminal 3 notifies the operator of the target response time and the measured response time by, for example, displaying the time on the monitor (Step S14). The operator checks a deviation of the target response time and the measured response time in accordance with the notification.

Thereafter, the operation terminal 3 determines whether the bandwidth adjusting process is stopped (Step S15). For example, when the operation terminal 3 receives an input of an instruction from the operator indicating that the bandwidth adjusting process is stopped, the operation terminal 3 determines that the bandwidth adjusting process is to be stopped.

If the operation terminal 3 determines that the bandwidth adjusting process is not stopped (No at Step S15), the operation terminal 3 returns to Step S14. In contrast, if the operation terminal 3 determines that the bandwidth adjusting process is stopped (Yes at Step S15), the operation terminal 3 ends the adjustment of the bandwidth.

In the following, a process performed by the operation management server 1 will be described. The monitoring unit 103 receives, from the operation terminal 3, an instruction to start the performance measurement. Then, the monitoring unit 103 instructs the performance information acquiring unit 251 in the storage device 2 to start the performance measurement (Step S21).

The setting unit 101 receives the target response time from the operation terminal 3. Then, the setting unit 101 writes the received target response time into the QoS setting table 141 (Step S22).

Thereafter, the setting unit 101 reads the target response time from the QoS setting table 141 and notifies the operation terminal 3 of the read the target response time (Step S23).

The monitoring unit 103 acquires the performance information on a volume and a resource (Step S24). Then, the monitoring unit 103 registers the performance information on a volume in the volume performance information file 143 and registers the performance information on a resource in the resource performance information file 144.

The bandwidth management unit 102 reads the performance information on the volume and the resource from the volume performance information file 143 and the resource performance information file 144, respectively (Step S25).

The bandwidth management unit 102 reads the target response time from the QoS setting table 141 (Step S26). Furthermore, the bandwidth management unit 102 acquires the measured response time from the volume performance information file 143. Then, the bandwidth management unit 102 sends the target response time and the measured response time to the operation terminal 3.

Thereafter, the bandwidth management unit 102 performs the bandwidth adjusting process (Step S27). In the following, the bandwidth adjusting process will be described in detail.

The bandwidth management unit 102 determines whether the bandwidth adjusting process is to be stopped (Step S28). For example, when the bandwidth management unit 102 receives, from the operation terminal 3, an instruction to stop the bandwidth adjusting process that is received from an operator, the bandwidth management unit 102 determines whether the bandwidth adjusting process is to be stopped.

If the bandwidth management unit 102 determines that the bandwidth adjusting process is not to be stopped (No at Step S28), the bandwidth management unit 102 returns to Step S24. In contrast, if the bandwidth management unit 102 determines that the bandwidth adjusting process is to be stopped (Yes at Step S28), the bandwidth management unit 102 ends the adjustment of the bandwidth.

In the following, a description will be given of a process performed by the storage device 2. The performance information acquiring unit 251 receives an instruction to start the performance measurement from the monitoring unit 103 in the operation management server 1. Then, the performance information acquiring unit 251 starts to measure performance information on each of the volumes 232 and starts to measure the performance related to the performance information on each of the resources (Step S31).

Then, the performance information acquiring unit 251 notifies the bandwidth management unit 102 in the operation management server 1 of the acquired performance information on each of the volumes 232 and of the acquired the performance related to the performance information on each of the resources (Step S32).

Thereafter, in response to the set command from the bandwidth management unit 102 in the operation management server 1, the bandwidth control unit 252 expands or reduces the bandwidth of the specified volume 232 and adjusts the specified bandwidth (Step S33).

The bandwidth control unit 252 determines whether the bandwidth adjusting process is to be stopped (Step S34). For example, if the bandwidth control unit 252 receives an instruction to stop the bandwidth adjusting process received from an operator is received from the operation management server 1, the bandwidth control unit 252 determines that the bandwidth adjusting process is to be stopped.

If the bandwidth control unit 252 determines that the bandwidth adjusting process is not to be stopped (No at Step S34), the bandwidth control unit 252 returns to Step S32. In contrast, if the bandwidth control unit 252 determines that the bandwidth adjusting process is to be stopped (Yes at Step S34), the bandwidth control unit 252 ends the adjustment of the bandwidth.

Figure 9:
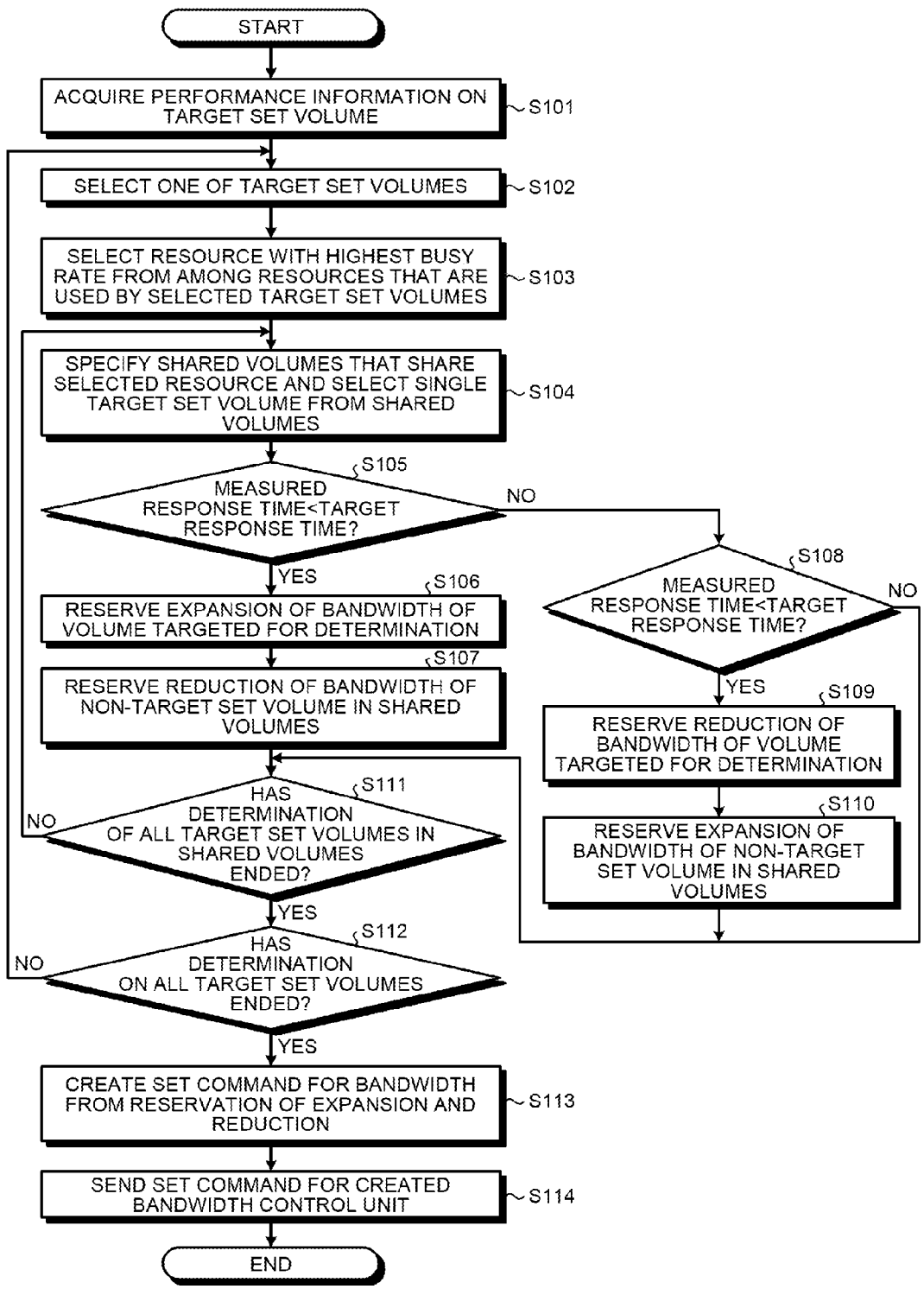
FIG. 9 is a flowchart illustrating the flow of a process of adjusting the bandwidth of a volume performed by an operation management server according to the first embodiment.

In the following, a process of adjusting the bandwidth of the volumes 232 performed by the operation management server 1 according to the first embodiment will be described with reference to FIG. 9. FIG. 9 is a flowchart illustrating the flow of a process of adjusting the bandwidth of a volume performed by an operation management server according to the first embodiment. The flowchart illustrated in FIG. 9 indicates, in detail, the process performed by the operation management server 1 at Step S27 illustrated in FIG. 8.

The bandwidth management unit 102 acquires the performance information on the target set volume from the volume performance information file 143 (Step S101).

The bandwidth management unit 102 selects one of the target set volumes (Step S102).

The bandwidth management unit 102 selects the resource with the highest busy rate from among the resources that are used by the selected target set volumes (Step S103).

Then, the bandwidth management unit 102 specifies shared volumes that share the selected resource. Furthermore, the bandwidth management unit 102 selects a target set volume from the shared volumes (Step S104).

The bandwidth management unit 102 determines whether the target response time of the selected target set volume is longer than the measured response time (Step S105). If the target response time is longer than the measured response time (Yes at Step S105), the bandwidth management unit 102 reserves an expansion of the bandwidth of the target set volume that is targeted for determination (Step S106).

Furthermore, the bandwidth management unit 102 reserves a reduction of the bandwidth of the non-target set volume in the shared volumes (Step S107).

In contrast, if the target response time is less than the measured response time (No at Step S105), the bandwidth management unit 102 determines whether the target response time of the selected target set volume is shorter than the measured response time (Step S108). If the target response time is not shorter than the measured response time (No at Step S108), the bandwidth management unit 102 proceeds to Step S111.

In contrast, if the target response time is shorter than the measured response time (Yes at Step S108), the bandwidth management unit 102 reserves a reduction of the bandwidth of the target set volume that is targeted for the determination (Step S109).

Furthermore, the bandwidth management unit 102 reserves an expansion of the bandwidth of the non-target set volume in the shared volumes (Step S110).

The bandwidth management unit 102 determines whether the determination of all of the target set volumes included in the shared volumes has ended (Step S111). Specifically, the bandwidth management unit 102 determines whether the second selection has been performed on all of the target set volumes included in the shared volumes. If a target set volume that has not been determined is present (No at Step S111), the bandwidth management unit 102 returns to Step S104.

In contrast, if the determination has been performed on all of the target set volumes included in the shared volumes (Yes at Step S111), the bandwidth management unit 102 determines whether the determination has been performed on all of the target set volumes (Step S112). Specifically, the bandwidth management unit 102 determines whether the first selection has been performed on all of the target set volumes. If a target set volume that has not been determined is present (No at Step S112), the bandwidth management unit 102 returns to Step S102.

In contrast, if the determination has been performed on all of the target set volumes (Yes at Step S112), the bandwidth management unit 102 decides to expand or reduce the bandwidth of each of the volumes 232 on the basis of the reservation of an expansion and a reduction performed on each of the volumes 232. Then, the bandwidth management unit 102 creates a set command that instructs the expansion and the reduction of the bandwidth of each of the decided volumes 232 (Step S113).

Thereafter, the bandwidth management unit 102 sends the created set command to the bandwidth control unit 252 (Step S114).

As described above, the storage management device according to the first embodiment automatically adjusts the bandwidth of volumes that share the resource to which a high load is applied such that the response time of the target set volume is within the target response time. Consequently, the storage management device according to the first embodiment can easily adjust the performance of the storage system by using the limit width of the bandwidth.

[b] Second Embodiment

In the following, a second embodiment will be described. The response time of each of the volumes 232 is proportional to the data size. If the data size varies, the bandwidth is adjusted in order to satisfy the set target response time. Furthermore, if the storage device 2 includes a cache, the bandwidth is adjusted because the response time varies depending on whether a cache hit occurs. Consequently, the bandwidth is adjusted even though a sufficient bandwidth is actually present and thus the performance of each volume becomes unstable.

Accordingly, a storage system according to a second embodiment differs from the storage system in the first embodiment in that the target response time that is input from the operation terminal 3 is corrected by using the data size and the cache hit rate. In a description below, descriptions of components having the same functions as those performed in the first embodiment will be omitted.

The operation terminal 3 receives, from an operator, an input of the target response time related to the predetermined data size and the cache hit rate. For example, the operation terminal 3 receives an input of the target response time that is obtained when the data size is 2 KB and the cache hit rate is 0%.

The bandwidth management unit 102 according to the second embodiment stores therein a correction formula of the response time represented by Formula (1) as below:

$$\left[\frac{\text{MEASURED DATA SIZE}}{\text{REFERENCE DATA SIZE}} \times \right.$$
$$\left. (\text{TARGET RESPONSE TIME} - \text{CONSTANT 1})\right] + \quad (1)$$
$$[\text{CONSTANT 1} \times \{\text{MEASURED CACHE HIT RATE} \times$$
$$\text{CONSTANT 2} + (1 - \text{MEASURED CACHE HIT RATE})]$$

The target response time is a value obtained when a predetermined data size and the cache hit rate input from the operation terminal 3 are used. Furthermore, the measured data size is a value obtained by dividing the measured throughput by the measured IOPS. The reference data size is a predetermined data size. Furthermore, a constant 1 is a value representing a portion that is not dependent on the data size in the response time. Furthermore, a constant 2 is the ratio of the disk access speed of a cache miss to a cache hit.

Furthermore, the bandwidth management unit 102 stores therein an assumed constant 1 and an assumed constant 2. A value obtained from a measured value by using a specific storage device 2 may also be used for the assumed constant 1 and the assumed constant 2.

In the following, a description will be given of the calculation of the constant 1 and the constant 2. The measured response time is represented by Formula (2) as below:

$$\frac{\text{MEASURED THROUGHPUT} \div \text{MEASURED } IOPS}{\text{MAXIMUM THROUGHPUT}} + \quad (2)$$
$$[\text{CONSTANT 3} \times$$
$$\{\text{MEASURED CACHE HIT RATE} \times \text{CONSTANT 4} +$$
$$(1 - \text{MEASURED CACHE HIT RATE})]$$

The maximum throughput is a throughput obtained when the maximum amount of data is transmitted through a transmission path that is monopolized by the volumes 232 that are targeted for the measurement of the measured response time.

When Formula (1) is compared with Formula (2), the first term of both formulae is a portion that depends on the data transfer speed and the second term of the formulae is a portion that depends on a cache.

Furthermore, the second term of Formula (1) is the same as that of Formula (2) if the constant 1 is replaced by the constant 3 and the constant 2 is replaced by the constant 4. The reason for this is because, in the QoS control, only the bandwidth that affects a data transfer speed is adjusted and a portion that depends on a cache is not adjusted. Consequently, the second term, which depends on a cache, of Formula (1) and Formula (2) is the same. Accordingly, the constant 1 and the constant 2 can be obtained from three formulae that are obtained by performing the measurement three times and substituting the measured response time, the measured throughput, the measured IOPS, and the measured cache hit rate in Formula (2).

Here, for the measured response time, a first measured value is represented by $A_1$, a second measured value is represented by $A_2$, and a third measured value is represented by $A_3$. Furthermore, for a value obtained by dividing the measured throughput by the measured IOPS, a first value thereof is represented by $B_1$, a second value thereof is represented by $B_2$, and a third value thereof is represented by $B_3$. Furthermore, for the measured cache hit rate, a first measured value is represented by $C_1$, a second measured value is represented by $C_2$, and a third measured value is represented by $C_3$.

At this point, when simultaneous equations of the maximum throughput, the constant 3, and the constant 4 are solved by substituting each value in Formula (2), the constant 3 and the constant 4 can be obtained as Formula (3).

$$\text{CONSTANT 3} = \left( \frac{\left( (A_2B_3 - A_2B_2)(C_1-1) + (A_3B_1 - A_1B_3)(C_2-1) + (A_1B_2 - A_2B_1)(C_3-1) \right)}{((B_1-B_2)(C_1-C_3) - (B_1-B_3)(C_1-C_2))} \right) \quad (3)$$

$$\text{CONSTANT 4} = \left( \frac{(A_1-A_3)(B_1-B_2) - (A_1-A_2)(B_1-B_3)}{(A_2B_3 - A_3B_2)(C_1-1) + (A_3B_1-A_1B_3)(C_2-1) + (A_1B_2 - A_2B_1)(C_3-1)} \right)$$

Namely, the constant 1 and the constant 2 can be obtained by using Formula (3).

Accordingly, a description will be given of calculating the constant 1 and the constant 2 by using these formulae and given of adjusting the bandwidth performed by the bandwidth management unit 102. The bandwidth management unit 102 acquires the measured response time, the measured throughput, the measured IOPS, and the measured cache hit rate from the volume performance information file 143.

If the measured response time, the measured throughput, the measured IOPS, and the measured cache hit rate each acquired from the immediately previous three measurements have not been obtained, the bandwidth management unit 102 substitutes the assumed constant 1 and the assumed constant 2 in Formula (1). Then, the bandwidth management unit 102 obtains, for each target set volume, correction target response time that is the target response time obtained by correcting, by using the measured data size, the reference data size, the target response time, and the measured cache hit rate, Formula (1) in which the assumed constant 1 and the assumed constant 2 are substituted. The correction of the target response time obtained by using the measured data size, the reference data size, the target response time, and the measured cache hit rate corresponds to an example of "normalization".

Then, similarly to the first embodiment, the bandwidth management unit 102 determines the adjustment of the bandwidth of each of the volumes 232 by using the obtained correction target response time. The bandwidth of each of the volumes 232 is adjusted to the bandwidth that is determined by the bandwidth management unit 102.

The bandwidth management unit 102 adjusts the bandwidth by using the assumed constant 1 and the assumed constant 2. The bandwidth management unit 102 repeatedly adjusts the bandwidth by using the assumed constant 1 and the assumed constant 2 until the immediately previous three measurements of the measured response time, the measured throughput, the measured TOPS, and the measured cache hit rate are obtained.

Furthermore, if the immediately previous three measurements of the measured response time, the measured throughput, the measured TOPS, and the measured cache hit rate have been obtained, the bandwidth management unit 102 obtains the constant 1 and the constant 2 by substituting the value, which is obtained by dividing the measured response time and the measured throughput that are adjusted by using the immediately previous three measurements by the measured TOPS, and the measured cache hit rate in Formula (3).

Then, the bandwidth management unit 102 substitutes the obtained constant 1 and the constant 2 in Formula (1). Then, the bandwidth management unit 102 obtains, for each target set volume, correction target response time that is the target response time obtained by correcting, by using the measured data size, the reference data size, the target response time, and the measured cache hit rate, Formula (1) in which the obtained constant 1 and the assumed constant 2 are substituted.

Then, similarly to the first embodiment, by using the obtained correction target response time, the bandwidth management unit 102 determines the adjustment of the bandwidth of each of the volumes 232. The bandwidth of each of the volumes 232 is adjusted to the bandwidth that is determined by the bandwidth management unit 102.

The bandwidth management unit 102 repeatedly calculates the constant 1 and the constant 2 and repeatedly adjusts the bandwidth by using the calculated constant 1 and the constant 2.

In the second embodiment, the bandwidth management unit 102 acquires performance information on each of the volumes 232 three times by obtaining values of the constant 1 and the constant 2 by using the assumed constant 1 and the assumed constant 2; however, it is allowable that the assumed constants is not used. Specifically, the bandwidth management unit 102 may acquire performance information on each of the volumes 232 without adjusting the bandwidth; obtain the constant 1 and the constant 2 by using the acquired performance information; and adjust the bandwidth of each of the volumes 232 by using the obtained constant 1 and the constant 2.

Furthermore, in the second embodiment, the bandwidth management unit 102 obtains the constant 1 and the constant 2; however, instead of obtaining the constants, the bandwidth of each of the volumes 232 may also be adjusted by using a predetermined value.

As described above, the storage management device according to the second embodiment corrects the input target response time by using the data size and the cache hit rate and then adjusts the bandwidth.

Consequently, it is possible to suppress an unwanted change in the bandwidth due to a change in the data size and a change in the cache hit rate and thus the storage device can be stably operated.

[c] Third Embodiment

In the following, a third embodiment will be described. In the first embodiment, if the measured response time is longer than the target response time, the bandwidth of the target volume 232 is expanded and the bandwidth of the other volumes is reduced. However, when the amount of data transmitted in the volume 232 of the bandwidth that is to be expanded is less than the set bandwidth, the measured response time is not improved even if the bandwidth is expanded. Furthermore, the bandwidths of the other volumes 232 are uselessly reduced. In such a case, the bandwidth is wasted.

Accordingly, a storage system according to the third embodiment differs from the storage system in the first embodiment in that the bandwidth is not expanded even if the measured response time of the volume 232 in which data of the bandwidth that is less than the set bandwidth is transmitted is inferior to the target response time. In a description below, descriptions of components having the same functions as those performed in the first embodiment will be omitted.

Figure 10:
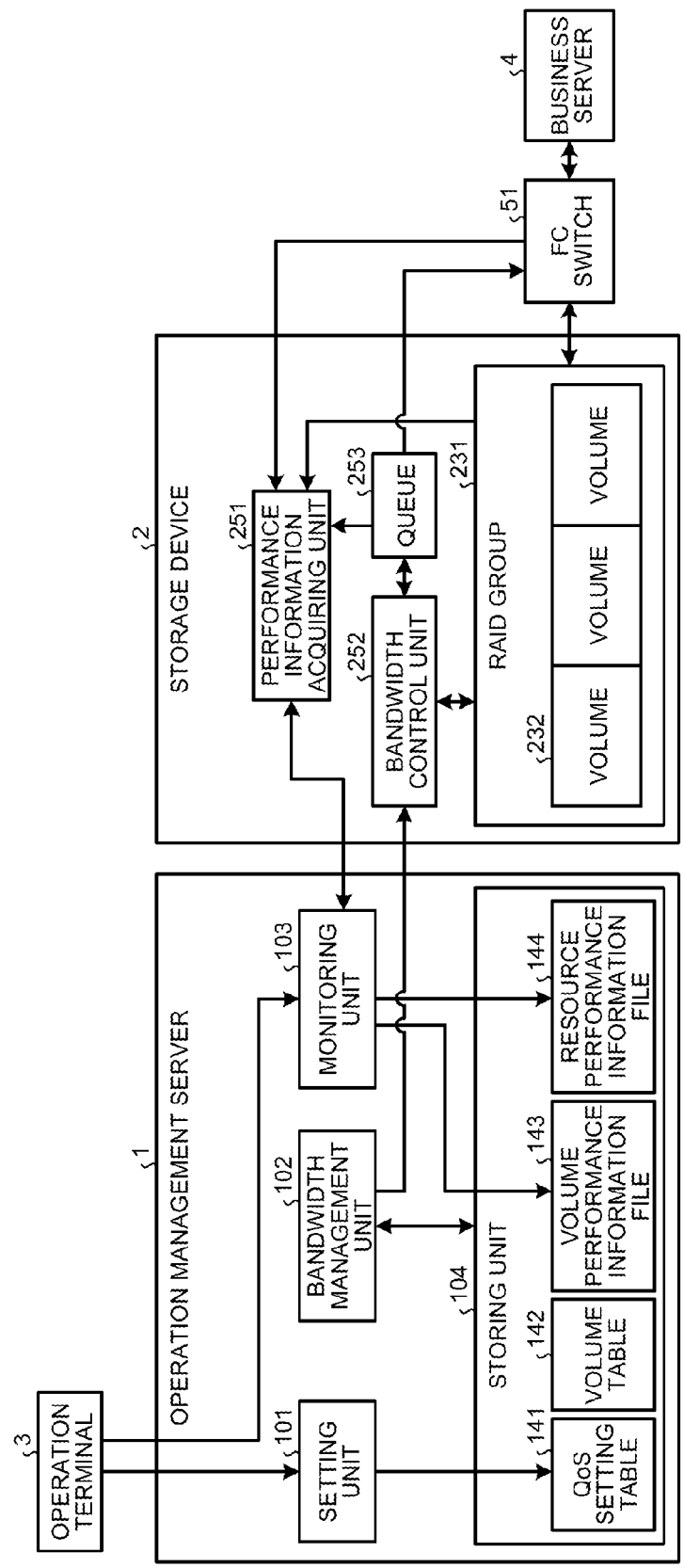
FIG. 10 is a block diagram illustrating an operation management server and a storage device according to a third embodiment.

FIG. 10 is a block diagram illustrating an operation management server and a storage device according to a third embodiment. The storage device 2 according to the third embodiment includes a queue 253.

The performance information acquiring unit 251 obtains the measured delay time by obtaining the sum total of the operation time of commands retained in the queue 253.

In addition to the measured response time, the measured throughput, the measured IOPS, and the measured cache hit rate of each of the volumes 232, the monitoring unit 103 acquires the measured delay time from the performance information acquiring unit 251 and then registers them in the volume performance information file 143.

The bandwidth management unit 102 compares the measured response time with the target response time of the target set volume that is selected at the second selection.

If the target response time is shorter than the measured response time and the delay time is not zero, the bandwidth management unit 102 reserves an expansion of the bandwidth of the selected target set volume. Furthermore, the bandwidth management unit 102 reserves a reduction of the bandwidth of a non-target set volume in the shared volume.

Furthermore, if the target response time is longer than the measured response time, the bandwidth management unit 102 reserves a reduction of the bandwidth of the selected target set volume. Furthermore, the bandwidth management unit 102 reserves an expansion of the bandwidth of a non-target set volume in the shared volume.

Then, the bandwidth management unit 102 decides an expansion or a reduction of each of the volumes 232 on the basis of the reservation of the expansion and the reduction. Then, the bandwidth management unit 102 creates a set command in accordance with the decided expansion or the decided reduction of each of the volumes 232. Then, the bandwidth management unit 102 sends the created set command to the bandwidth control unit 252.

As described above, the storage management device according to the third embodiment expands the bandwidth only when a delay time has occurred in the target volume and reduces the bandwidth of the associated non-target set volume. Consequently, it is possible to suppress a waste of the bandwidth.

Furthermore, the function performed in the third embodiment may also be used for the second embodiment. In such a case, a waste of the bandwidth can also be suppressed.

[d] Fourth Embodiment

In the following, a fourth embodiment will be described. In the first embodiment, if the measured response time is shorter than the target response time, the bandwidth of the target volume 232 is reduced. However, if the usage rate of the storage device 2 varies due to the time or a period, such as an idle time period or a busy time period, the measured response time continues to fall below the target response time during an idle time period and the bandwidth of the volume 232 is significantly reduced. In this state, if the state is changed to a busy time period, because the amount of data transfer is sharply increased, the measured response time is suddenly degraded and thus there is a possibility that the adjustment of the bandwidth is not in time.

Accordingly, a storage system according to the fourth embodiment differs from the storage system in the first embodiment in that the limit width of the bandwidth is reduced when the measured response time of the other target set volume in the shared volume falls below the target response time. The storage system according to the fourth embodiment is also represented by the block diagram illustrated in FIG. 3. In a description below, descriptions of components having the same functions as those performed in the first embodiment will be omitted.

The bandwidth management unit 102 extracts a resource having the highest busy rate from among the resources that are used by the target set volumes selected at the first selection. Then, the bandwidth management unit 102 specifies shared volumes that share the specified resource.

Then, the bandwidth management unit 102 determines whether a target set volume in which the target response time is shorter than the measured response time is present in the target set volumes that are included in the shared volume.

Then, the bandwidth management unit 102 performs the second selection in which a single target set volume is selected from the target set volumes that are included in the shared volume. Then, the bandwidth management unit 102 compares the measured response time with the target response time of the target set volume that has been selected at the second selection.

If the target response time is shorter than the measured response time, the bandwidth management unit 102 reserves an expansion of the bandwidth of the selected target set volume. Furthermore, the bandwidth management unit 102 reserves a reduction of the bandwidth of a non-target set volume in the shared volume.

If the target response time is longer than the measured response time, when a target set volume in which the target response time is shorter than the measured response time is present in the shared volume that is targeted for the determination, the bandwidth management unit 102 reserves a reduction of the bandwidth of the selected target set volume. Furthermore, the bandwidth management unit 102 reserves an expansion of the bandwidth of the non-target set volume in the shared volume.

Thereafter, the bandwidth management unit 102 decides an expansion or a reduction of each of the volumes 232 on the basis of the reservation of the expansion and the reduction. Then, the bandwidth management unit 102 creates a set command in accordance with the decided expansion or the decided reduction of each of the volumes 232. Then, the bandwidth management unit 102 sends the created set command to the bandwidth control unit 252.

As described above, if a volume that does not satisfy the target response time is present in the volumes that share the same resource, the storage management device according to the fourth embodiment reduces the bandwidth of the volume that satisfies the target response time. Consequently, even if a use frequency of the storage device is low, a reduction of the bandwidth is not performed as long as the performance of the other volumes is insufficient. Consequently, it is possible to avoid the response time from worsening when the use frequency of the storage device is shifted from a low state to a high state and thus the amount of data transfer is sharply increased.

Furthermore, in the fourth embodiment, a description has been given of a case in which a new function is added to the first embodiment; however, the function performed in the fourth embodiment may also be added to the second embodiment or the third embodiment. In such a case, it is also possible to avoid the response time from worsening when the use frequency of the storage device is shifted from a low state to a high state and thus the amount of data transfer is sharply increased.

[e] Fifth Embodiment

In the following, a fifth embodiment will be described. In the first embodiment, a resource that has the highest busy rate is simply selected and the bandwidth is adjusted for the volumes that share the resource. However, because the upper limit of the busy rate differs if the type of resources differs, when a resource is determined by simply comparing the busy rates, it may possibly be difficult to appropriately select a resource that mostly affects the degradation of the performance.

Accordingly, a storage system according to the fifth embodiment differs from the storage system in the first embodiment in that the storage system selects a resource to which the highest load is applied on the basis of the value corrected by taking into consideration the busy rate of each of the resources. The storage system according to the fifth embodiment is also represented by the block diagram illustrated in FIG. 3. In a description below, descriptions of components having the same functions as those performed in the first embodiment will be omitted.

Figure 11A:
FIG. 11A is a schematic diagram illustrating an example of a correction coefficient table.

The bandwidth management unit 102 according to the fifth embodiment includes a correction coefficient table 145 illustrated in FIG. 11A in which correction coefficients that are used to correct the busy rate of each of the resources are registered for each resource. FIG. 11A is a schematic diagram illustrating an example of a correction coefficient table. For example, in a port, if the busy rate becomes about 40%, this state corresponds to a high load. However, in a CPU or a RAID group, a high load reaches only after the busy rate becomes about 90%. Consequently, if a RAID group is used as a reference, substantially the same rate may be used for a CPU; however, busy rate of a port or a switch port is preferably converted by a factor of two. In this way, the correction coefficient is preferably obtained by using the upper limit of the busy rate of each of the resources as a reference.

The bandwidth management unit 102 acquired, from the resource performance information file 144, the resource type and the busy rate of a resource that is used by the target set volume that is selected at the first selection. Hereinafter, the busy rate of each of the resources registered in the resource performance information file 144 is referred to as a "measured busy rate".

The bandwidth management unit 102 obtains the correction busy rate of each of the resources by multiplying the measured busy rate of each of the acquired resources by the correction coefficient that is associated with the type of the resource acquired from the correction coefficient table 145. Consequently, the busy rate of each of the resources is normalized.

Figure 11B:
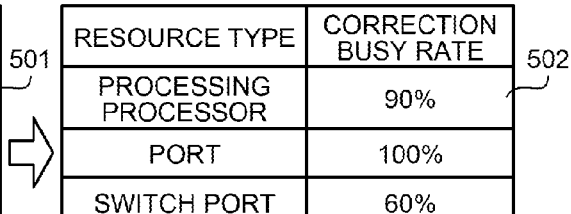
FIG. 11B is a schematic diagram illustrating calculation of a correction busy rate.

FIG. 11B is a schematic diagram illustrating calculation of a correction busy rate. For example, it is assumed that the measured busy rate indicated on the left side of the arrow illustrated in FIG. 11B is acquired from the resource performance information file 144 by the bandwidth management unit 102. The bandwidth management unit 102 calculates the correction busy rate indicated on the right side of the arrow illustrated in FIG. 11B by multiplying the measured busy rate by the correction coefficient of each of the resources indicated in the correction coefficient table 145 illustrated in FIG. 11A. In this case, for the measured busy rate, the busy rate of the processing processor indicated by a list 501 is the highest busy rate; however, for correction busy rate, the busy rate of the port indicated by a list 502 is the highest busy rate.

Accordingly, for example, in a case of FIG. 11B, if a port #0 represents a port of the FC-CA 211, the bandwidth management unit 102 extracts the port of the FC-CA 211 as the resource that has the highest busy rate.

Then, the bandwidth management unit 102 specifies the shared volume of the extracted resource; reserves an expansion and a reduction of the bandwidth of the shared volume for each target set volume in the shared volume; and then decides the expansion and the reduction of the bandwidth of each of the volumes on the basis of the reservation states.

As described above, the storage management device according to the fifth embodiment specifies a resource having the highest busy rate on the basis of a value normalized by correcting the busy rate of a resource by using the upper limit of the busy rate for each type of resource. Consequently, it is possible to compare the busy rates by using the same upper limit of the busy rate for each type of resource and thus appropriately select a resource that mostly affects the degradation of the performance.

Furthermore, in the fifth embodiment, a description has been given of a case in which a new function is added to the first embodiment; however, the function performed in the fifth embodiment may also be added to the second to the fourth embodiments. In such a case, the busy rates can be compared by using the same upper limit of the busy rate for each type of resource and thus a resource that mostly affects the degradation of the performance can be appropriately selected.

[f] Sixth Embodiment

In the following, a sixth embodiment will be described. In the first embodiment, when the bandwidth is changed, the storage device 2 receives a set command that is created by the bandwidth management unit 102 and adjusts the bandwidth of each of the volumes 232 in accordance with the set command. At this point, it takes a certain time to issue the set command. Furthermore, in the first embodiment, because the bandwidth is adjusted for all of the volumes 232 without giving priority, the number of set commands to be issued becomes great. In such a case, adjustment of the bandwidth of the volumes 232 that do not contribute much to the performance adjustment is performed first and thus it may possibly take time to converge to the target response time.

Accordingly, a storage system according to the sixth embodiment differs from the storage system in the first embodiment in that the storage system adjusts, with priority, the bandwidth of the volumes 232 in each of which the effect of adjusting the bandwidth is high. The storage system according to the sixth embodiment is also represented by the block diagram illustrated in FIG. 3. In a description below, descriptions of components having the same functions as those performed in the first embodiment will be omitted.

In the sixth embodiment, it is assumed that the storage device 2 can adjust, by using a single set command, the bandwidth of the volumes 232 that are included in a single management group. The management group mentioned here is a group that is integrally managed by the storage device 2 and in which the volumes 232 are included. Furthermore, the management group is specified by a combination of the communication adapters on the business server 4 side, such as the FC-HBA 411, the storage devices 2, the CPUs 213 that are processing processors, and ports of the FC-CA 211 or the iSCSI-CA 212.

The bandwidth management unit 102 stores therein a management group specification table 146 that is illustrated in FIG. 12 and in which information for specifying a management group is registered. FIG. 12 is a schematic diagram illustrating an example of a management group specification table.

Figures 13, 14:
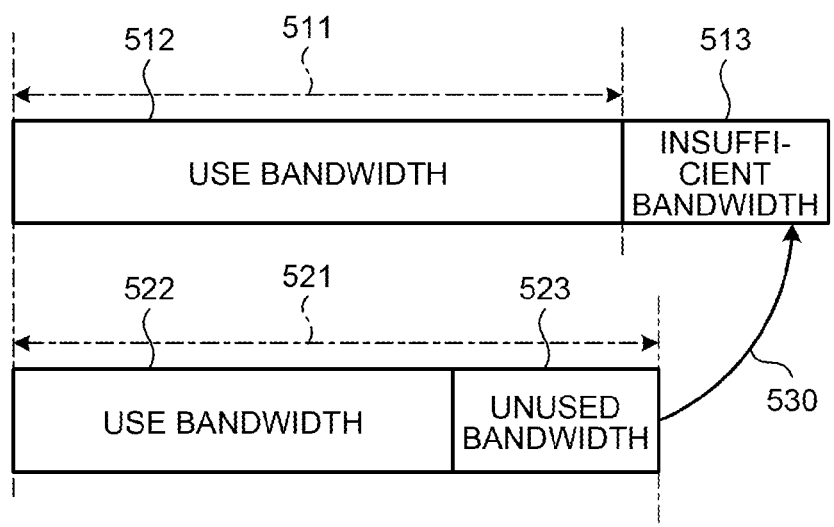
FIG. 13 is a schematic diagram illustrating an example of a management group table.
FIG. 14 is a schematic diagram illustrating the help of a bandwidth.

Furthermore, the bandwidth management unit 102 stores therein a management group table 147 that is illustrated in FIG. 13 and in which the management group to which each of the volumes 232 are belongs. FIG. 13 is a schematic diagram illustrating an example of a management group table.

For the target set volumes that are selected at the second selection, the bandwidth management unit 102 compares the target response time with the measured response time.

If the target response time is shorter than the measured response time, the bandwidth management unit 102 reserves an expansion of the bandwidth of the selected target set volume. Furthermore, the bandwidth management unit 102 reserves a reduction of the bandwidth of a non-target set volume in the shared volume. Furthermore, the bandwidth management unit 102 obtains the absolute value of the difference between the target response time of the selected target set volume and the measured response time and then stores therein the absolute value. However, if the bandwidth of the selected target set volume is the maximum and is not able to be expanded, the bandwidth management unit 102 does not store therein the absolute value.

If the target response time is longer than the measured response time, the bandwidth management unit 102 reserves a reduction of the bandwidth of the selected target set volume. Furthermore, the bandwidth management unit 102 reserves an expansion of the bandwidth of a non-target set volume in a shared volume. Furthermore, the bandwidth management unit 102 obtains the absolute value of the difference between the target response time of the selected target set volume and the measured response time. However, if the bandwidth of the selected target set volume is the minimum and is not able to be reduced, the bandwidth management unit 102 does not store therein the absolute value.

Then, the bandwidth management unit 102 decides an expansion or a reduction of the bandwidth of each of the volumes 232. Then, the bandwidth management unit 102 creates a set command for each of the volumes 232 targeted for the expansion or the reduction.

Then, the bandwidth management unit 102 selects a management group from the management group specification table 146 one by one. Then, the bandwidth management unit 102 acquires, from the management group table 147, the volumes 232 included in the selected management group. Then, the bandwidth management unit 102 obtains the sum total of the absolute values of the difference between the target response time of each of the acquired volumes 232 and the measured response time. Furthermore, if the difference between the target response time and the measured response time is zero, the bandwidth management unit 102 counts the number of non-target set volumes included in that management group.

Thereafter, the bandwidth management unit 102 sorts management groups in descending order of the sum totals of the absolute value of the differences between the target response time and the measured response time. Furthermore, the bandwidth management unit 102 sorts the management groups, in which the difference between the target response time and the measured response time is zero, in descending order of the number of the included non-target set volumes.

Then, the bandwidth management unit 102 acquires, from the created commands, a set command for a predetermined number of management groups from the top from among the sorted management groups. For example, the bandwidth management unit 102 acquires, from the created set commands, a set command for 10 management groups from the top from among the sorted management groups.

Then, the bandwidth management unit 102 sends the acquired set command to the bandwidth control unit 252.

The bandwidth control unit 252 adjusts the bandwidth of the volumes 232 in accordance with the set command sent from the bandwidth management unit 102. At this point, the sent set command is an instruction given to the management group that includes a large number of volumes in which the total sum of the absolute values of the differences between the target response time and the measured response time is great or in which the target response time is not set. Accordingly, the bandwidth control unit 252 adjusts the bandwidth of the volumes 232 in the management group in which the total sum of the absolute values of the differences between the target response time and the measured response time is great or the management group that includes a large number of non-target set volumes. When the total sum of the absolute values of the differences between the target response time and the measured response time is great or a large number of non-target set volumes are included, by adjusting the bandwidth of the volumes 232 in the target management group, a high effect of performance improvement can be obtained. Specifically, the bandwidth control unit 252 can change only the bandwidth of the volumes 232 included in the management group in which a high effect of performance improvement can be obtained.

As described above, the storage management device according to the sixth embodiment selects a command that greatly contributes to the performance adjustment and executes the command. Consequently, it is possible to reduce the number of commands and the convergence time to the target response time.

Furthermore, in the sixth embodiment, a description has been given of a case in which a new function is added to the first embodiment; however, the function performed in the sixth embodiment may also be added to the second to the fifth embodiments. In such a case, it is also possible to reduce the number of commands and the convergence time to the target response time.

[g] Seventh Embodiment

In the following, a seventh embodiment will be described. In the first embodiment, for the response time, a value of a combination of the read response time obtained when data is read and the write response time obtained when data is written is targeted for evaluation. However, in some cases depending on operations, operation methods of the storage device 2 may vary, such as an operation in which a read access to the storage device 2 is frequently performed, a write access is frequently performed, both are uniformly accessed, or the like. Consequently, when both the read response time and the write response time are integrally considered, it may possibly be difficult to appropriately adjust the bandwidth.

Accordingly, a storage system according to the seventh embodiment differs from the storage system in the first embodiment in that the storage system adjusts the bandwidth by using, as the target response time, the target read response time and the target write response time. The storage system according to the seventh embodiment is also represented by the block diagram illustrated in FIG. 3. In a description below, descriptions of components having the same functions as those performed in the first embodiment will be omitted.

The operation terminal 3 sends, to the setting unit 101, the target read response time and the target write response time of each of the volumes 232 that are input by an operator.

The performance information acquiring unit 251 acquires, as the measured response time, the measured read response time, which is the response time of the reading, and the measured write response time, which is the response time of the writing.

The setting unit 101 registers the received target read response time and the target write response time in the QoS setting table 141.

The monitoring unit 103 acquires, as the measured response time of each of the volumes 232, the measured read response time and the measured write response time and registers them in the volume performance information file 143.

The bandwidth management unit 102 acquires, from the volume performance information file 143, the measured read response time and the measured write response time of the target set volume selected at the second selection. Furthermore, the bandwidth management unit 102 acquires, from the QoS setting table 141, the target read response time and the target write response time of the target set volume selected at the second selection.

Then, the bandwidth management unit 102 compares the measured read response time with the target read response time of the target set volume selected at the second selection and, furthermore, compares the measured write response time with the target write response time.

If the target read response time is shorter than the measured read response time or the target write response time is shorter than the measured write response time, the bandwidth management unit 102 reserves an expansion of the bandwidth of the selected target set volume. Furthermore, the bandwidth management unit 102 reserves a reduction of the bandwidth of a non-target set volume included in a shared volume.

Furthermore, if the target read response time is longer than the measured read response time and the target write response time is longer than the measured write response time, the bandwidth management unit 102 reserves a reduction of the bandwidth of the selected target set volume. Furthermore, the bandwidth management unit 102 reserves an expansion of the bandwidth of a non-target set volume included in the shared volume.

Then, the bandwidth management unit 102 decides an expansion or a reduction of each of the volumes 232 on the basis of the reservation of the expansion and the reduction. Then, the bandwidth management unit 102 creates a set command in accordance with the expansion or the reduction of each of the decided volumes 232. Then, the bandwidth management unit 102 sends the created set command to the bandwidth control unit 252.

As described above, the storage management device according to the seventh embodiment adjusts the bandwidth by using the read response time and the write response time. Consequently, it is possible to finely adjust the bandwidth in accordance with the operation method of the storage device.

Furthermore, in the seventh embodiment, a description has been given of a case in which a new function is added to the first embodiment; however, the function performed in the seventh embodiment may also be added to the second to the sixth embodiments. In such a case, the bandwidth can be finely adjusted in accordance with the operation method of the storage device.

[h] Eighth Embodiment

In the following, an eighth embodiment will be described. In the first to the seventh embodiments, when the target response time is specified to the volumes 232, the bandwidth is adjusted in accordance with the specified target response time. Consequently, the performance of a non-target set volume is not guaranteed. Accordingly, in order to guarantee the performance of all of the volumes 232, target response time is preferably set to all of the volumes 232. However, setting target response time to all of the volumes 232 is complicated.

Accordingly, a storage system according to the eighth embodiment differs from the storage system in the first embodiment in that the storage system lends the bandwidth of the volume 232 with a sufficient bandwidth to the volume 232 with an insufficient bandwidth. The storage system according to the eighth embodiment is also represented by the block diagram illustrated in FIG. 3. In a description below, descriptions of components having the same functions as those performed in the first embodiment will be omitted.

At this point, the adjustment of the bandwidth is performed at bandwidth limit time intervals that correspond to a certain time period. Accordingly, the use state of the bandwidth is determined at the bandwidth limit time intervals. However, even if an unused area is found when the time reaches the time of the bandwidth limit time, the bandwidth limit time intervals have ended; therefore, it is difficult to lend the bandwidth. Thus, it is preferable to shorten the time period for which determination of whether an unused area is present.

In the following, a description will be given of a method of shortening the time period for which determination of whether an unused area is present. However, any method may also be used as long as the time period for which determination of whether an unused area is present is reduced.

First, the bandwidth limit time interval is divided into multiple time periods. Hereinafter, the divided time period is referred to as a "division bandwidth limit time interval".

The bandwidth management unit 102 sends a set command that instructs the bandwidth control unit 252 to lend the bandwidth.

Furthermore, the bandwidth management unit 102 sends, to the bandwidth control unit 252, a set command for adjusting the bandwidth that is used to expand and reduce the bandwidth that is obtained in the first embodiment.

The bandwidth control unit 252 uses the bandwidth that is specified by the set command for adjusting the bandwidth that is sent from the bandwidth management unit 102 as a temporary bandwidth.

The bandwidth control unit 252 includes a communication data size counter that counts the communication data size for each of the volume 232. When the bandwidth control unit 252 receives a set command for adjusting the bandwidth, the bandwidth control unit 252 resets the communication data size counter. Then, if data is sent and received to and from each of the volumes 232, the bandwidth control unit 252 increments the communication data size counter and counts the communication data size.

If the communication data size in one of the volumes 232 exceeds a value obtained by multiplying the temporary bandwidth by the division bandwidth limit time interval, the bandwidth control unit 252 suspends the communication data that is to be sent to the volume 232.

Thereafter, if the time reaches the division bandwidth limit time interval, the bandwidth control unit 252 temporary increases and decreases the bandwidth as follows.

If the communication data size of the volume 232 is greater than the value obtained by multiplying the temporary bandwidth by the division bandwidth limit time interval, the bandwidth control unit 252 reserves a temporary increase in the bandwidth.

Furthermore, if the communication data size of the volume 232 is smaller than the value obtained by multiplying the temporary bandwidth by the division bandwidth limit time interval, the bandwidth control unit 252 reserves a temporary reduction of the bandwidth.

Then, the bandwidth control unit 252 adjusts a temporary increase/decrease in the bandwidth of each of the volumes 232 in accordance with the reservation of a temporary increase and a temporary decrease in the bandwidth and decides the temporary bandwidth for each of the volumes 232.

FIG. 14 is a schematic diagram illustrating the help of a bandwidth. The upper portion of FIG. 14 illustrates the use state of the bandwidth of one of the volumes 232 with an insufficient bandwidth. Furthermore, the lower portion of FIG. 14 illustrates the use state of the bandwidth of one of the volumes 232 with a sufficient bandwidth.

The bandwidth that is set in the volume 232 with an insufficient bandwidth is a bandwidth 511. However, in the volume 232 with an insufficient bandwidth, the entirety of the bandwidth 511 is used as a use bandwidth 512 and, furthermore, an insufficient bandwidth 513 has occurred.

In contrast, the bandwidth that is set in the volume 232 with a sufficient bandwidth is a bandwidth 521. However, the volume 232 with a sufficient bandwidth uses a use bandwidth 522 and does not use an unused bandwidth 523.

Accordingly, when the bandwidth control unit 252 detects a state illustrated in FIG. 14 at the time of the division bandwidth limit time interval, as indicated by an arrow 530, the bandwidth control unit 252 lends the unused bandwidth 523 to the insufficient bandwidth 513.

Then, the bandwidth control unit 252 resets the communication data size counter of each of the volumes 232. Furthermore, the bandwidth control unit 252 resumes data communication performed on the volume 232 in which the data communication is temporary suspended.

Then, the bandwidth control unit 252 controls an operation such that each of the volumes 232 communicates by using the bandwidth that is decided for each of the volumes 232.

The bandwidth control unit 252 repeatedly controls the temporary lend until the time reaches the bandwidth limit time interval. Then, when the time reaches the bandwidth limit time interval, the bandwidth control unit 252 receives a command for adjusting the bandwidth from the bandwidth management unit 102 and repeats the control of the temporary lend on the basis of the bandwidth that is specified by the received command.

Figure 15:
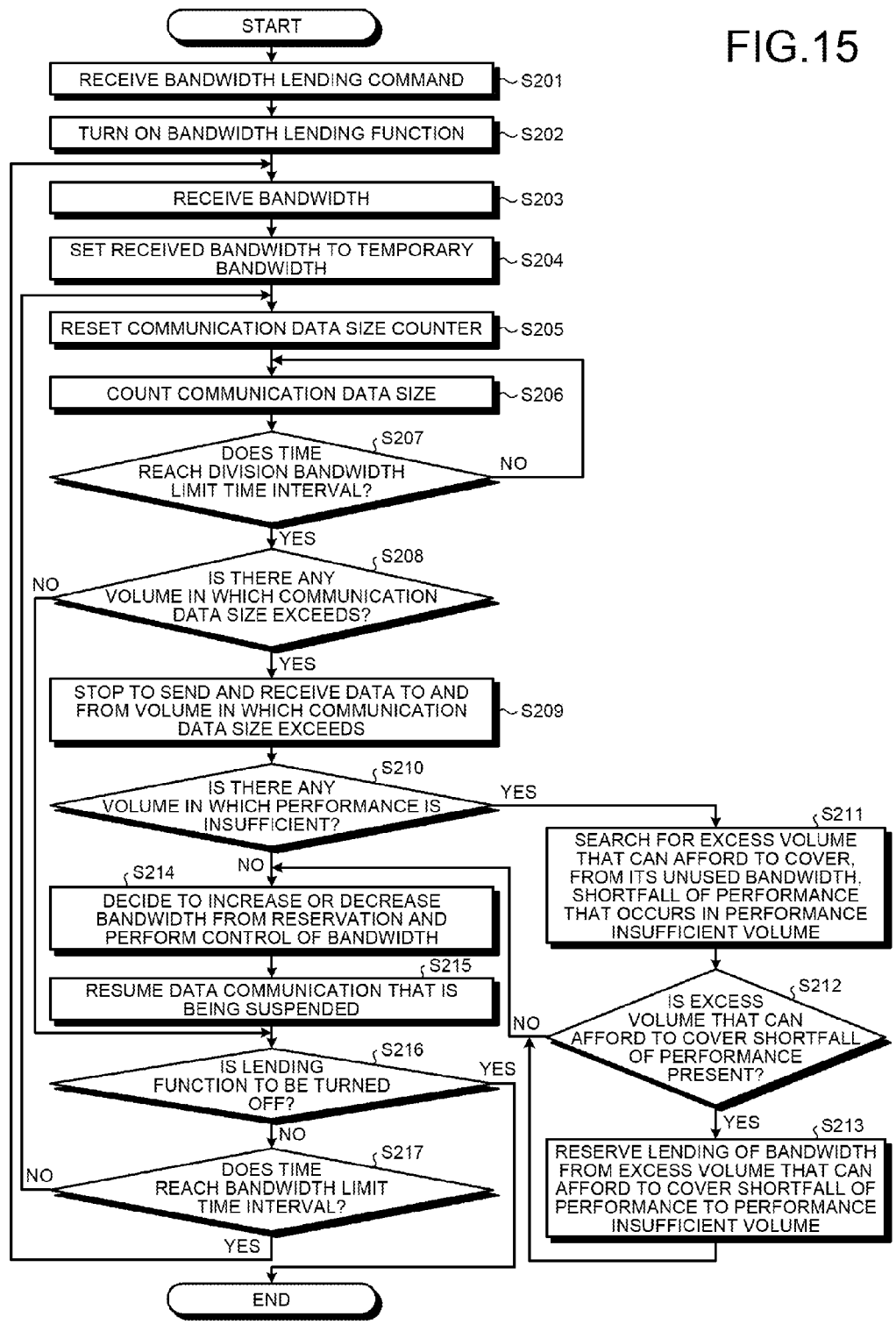
FIG. 15 is a flowchart illustrating the flow of a help process performed on a bandwidth by a storage device according to an eighth embodiment.

In the following, the flow of a lending process of the bandwidth used in the storage device according to the eighth embodiment will be described with reference to FIG. 15. FIG. 15 is a flowchart illustrating the flow of a help process performed on a bandwidth by a storage device according to an eighth embodiment.

The process indicated by the flowchart illustrated in FIG. 15 is a process performed during the time period for which the bandwidth of the volume 232 is adjusted by the operation management server 1.

The bandwidth control unit 252 receives, from the bandwidth management unit 102, a bandwidth lending command that instructs the lending of the bandwidth (Step S201).

Then, the bandwidth control unit 252 turns on a bandwidth lending function (Step S202).

The bandwidth control unit 252 receives a set command for adjusting the bandwidth determined by the bandwidth management unit 102. Then, the bandwidth control unit 252 receives the bandwidth of each of the volumes 232 specified by the set command for adjusting the bandwidth (Step S203).

The bandwidth control unit 252 sets the received bandwidth to the temporary bandwidth (Step S204).

The bandwidth control unit 252 resets the communication data size counter of each of the volumes 232 (Step S205).

The bandwidth control unit 252 counts the communication data size of each of the volumes 232 (Step S206).

The bandwidth control unit 252 determines whether the time reaches the division bandwidth limit time interval (Step S207). If the time has not reached the division bandwidth limit time interval (No at Step S207), the bandwidth control unit 252 returns to Step S206.

In contrast, if the time has reached the division bandwidth limit time interval (Yes at Step S207), the bandwidth control unit 252 determines whether a volume in which the communication data size exceeds the value obtained by multiplying the temporary bandwidth by the division bandwidth limit time interval (Step S208). If no volume in which the communication data size exceeds the value obtained by multiplying the temporary bandwidth by the division bandwidth limit time interval is present (No at Step S208), the bandwidth control unit 252 proceeds to Step S216.

In contrast, if a volume in which the communication data size exceeds the value obtained by multiplying the temporary bandwidth by the division bandwidth limit time interval is present (Yes at Step S208), the bandwidth control unit 252 stops to send and receive data to and from the volume 232 in which the communication data size exceeds (Step S209).

Then, the bandwidth control unit 252 determines whether there is a performance insufficient volume in which the communication data size exceeds the value obtained by multiplying the temporary bandwidth by the division bandwidth limit time interval (Step S210). If no performance insufficient volume is present (No at Step S210), the bandwidth control unit 252 proceeds to Step S214.

In contrast, if a performance insufficient volume is present (Yes at Step S210), the bandwidth control unit 252 searches for an excess volume that can afford to cover, from its unused bandwidth, a shortfall of the performance that occurs in the performance insufficient volume (Step S211).

Then, the bandwidth control unit 252 determines whether an excess volume that can afford to cover a shortfall of the performance that occurs in the performance insufficient volume is present (Step S212). If no excess volume that can afford to cover a shortfall of the performance that occurs in the performance insufficient volume is present (No at Step S212), the bandwidth control unit 252 proceeds to Step S214.

In contrast, if an excess volume that can afford to cover a shortfall of the performance that occurs in the performance insufficient volume is present (Yes at Step S212), the bandwidth control unit 252 reserves the lending of the bandwidth from the excess volume that can afford to cover a shortfall of the performance to the performance insufficient volume (Step S213). Then, the bandwidth control unit 252 excludes the volume 232 in which the lending of the bandwidth is reserved from among the performance insufficient volumes. Then, the bandwidth control unit 252 proceeds to Step S214.

Then, the bandwidth control unit 252 decides to increase or decrease the bandwidth of each of the volumes 232 from the reservation and then performs the control of the bandwidth (Step S214).

Furthermore, the bandwidth control unit 252 resumes the data communication to be performed on the volume 232 in which the data communication is being suspended (Step S215).

Thereafter, the bandwidth control unit 252 determines whether the lending function of the bandwidth is to be turned off (Step S216). If the lending function is not turned off (No at Step S216), the bandwidth control unit 252 determines whether the time reaches the bandwidth limit time interval (Step S217). If the time reaches to the bandwidth limit time interval (Yes at Step S217), the bandwidth control unit 252 returns to Step S203. In contrast, if the time has not reached the bandwidth limit time interval (No at Step S217), the bandwidth control unit 252 returns to Step S205.

In contrast, if the lending function is turned off (Yes at Step S216), the bandwidth control unit 252 ends the lending process on the bandwidth.

As described above, with the storage management device according to the eighth embodiment, even if a target response is not set, the lending of the bandwidth is automatically performed. Consequently, the performance of all of the volumes can be guaranteed.

According to an aspect of an embodiment of a storage management device, a control method, and a control program, an advantage is provided in that it is easily adjust the performance of the storage system by using a bandwidth limit width.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage management device that manages a storage apparatus in which a plurality of storage units are included and data is sent and received via transmission resources, the storage management device comprising:
   a memory that stores a procedure including executable instructions and setting information of all of the storage units; and
   a processor coupled to the memory, the processor executing the procedure including:
     registering, in the setting information, a target value of performance set to some or all of the storage units;
     selecting one storage unit of which the target value is registered in the setting information among all of the storage units;
     monitoring a load factor of the transmission resources;
     selecting one resource based on the load factor among the transmission resources that are used by the selected one storage unit;
     specifying sharing storage units that share the selected one resource;
     selecting a plurality of first storage units of which the target value is registered in the setting information from the sharing storage units;
     reserving adjustment of a bandwidth in the first storage units and second storage units of which the target values are not registered in the setting information among the sharing storage units based on differences between the target value and a measured performance of the storage unit;
     deciding, based on reservation of the adjustment of the bandwidth, bandwidth allocation of the sharing storage units; and
     adjusting the bandwidth based on the decided bandwidth allocation.

2. The storage management device according to claim 1 further comprising a switch that connects the storage apparatus to an external device and that includes switch ports, wherein the storage apparatus includes
   RAID groups that include the storage units,
   processing processors that execute a process of sending and receiving data to and from the storage units, and
   ports to which the switch is connected, and
   the transmission resources include some or all of the RAID group, the processing processor, the port, and the switch port.

3. The storage management device according to claim 1, wherein the processor uses the load factor of the transmission resources such that the upper limit of the load factor is used as a reference for the normalization.

4. The storage management device according to claim 1, wherein the processor:
   obtains the differences between the bandwidth that is set in each of the storage units and a used bandwidth,
   reduces the bandwidth of the storage unit in which, in a predetermined time period, the used bandwidth is less than the set bandwidth, and
   expands, by an amount corresponding to the reduced amount, the bandwidth of the storage unit in which the used bandwidth is greater than the set bandwidth.

5. The storage management device according to claim 1, wherein the processor:
   extends the bandwidth of the extracted storage units with a sufficient bandwidth, and
   reduces the bandwidth of the extracted storage units with an insufficient bandwidth.

6. The storage management device according to claim 1, wherein the processor performs, for each storage unit in which the target value is set, a process that:
   specifies a transmission resource that has the highest load factor as the one resource,
   specify the sharing storage units that share the one resource and
   decides bandwidth allocation of the sharing storage units.

7. The storage management device according to claim 6, wherein the processor:
   sets, as the target value of the performance, a target value of the response time when reading is performed and a target value of the response time when writing is performed, and from among the extracted storage units,
   expands the bandwidth of the transmission path that is used by the storage unit in which the response time of the measured writing or the response time of the measured reading is longer than the target value,
   reduces the bandwidth of the transmission path that is used by the storage unit in which the target value is not set and that uses the specified transmission resource,
   reduces the bandwidth of the transmission path that is used by the storage unit in which the response time of the measured writing and the response time of the measured reading are shorter than the target value, and
   expands the bandwidth of the storage unit in which the target value is not set and that uses the specified transmission resource.

8. The storage management device according to claim 6, wherein, from among the sharing storage units, the processor:
expands the bandwidth of the transmission path used by the storage unit in which measured performance is less than the target value,
reduces the bandwidth of the transmission path used by the storage unit in which the target value is not set and that uses the specified transmission resource,
reduces the bandwidth of the transmission path used by the storage unit in which measured performance is greater than the target value, and
expands the bandwidth of the transmission path used by the storage unit in which the target value is not set and that uses the specified transmission resource.

9. The storage management device according to claim 8, wherein, from among the extracted storage units, the processor:
expands the bandwidth of the transmission path used by the storage unit in which measured performance is less than the target value and
sends and receives data of a bandwidth that is equal to or greater than the bandwidth.

10. The storage management device according to claim 8, wherein, when another storage unit in which measured performance is less than the target value is present in the sharing storage units, the processor:
reduces the bandwidth of the transmission path used by the storage unit in which measured performance is greater than the target value and
expands the bandwidth of the storage unit in which the target value is not set and that uses the specified transmission resource.

11. The storage management device according to claim 1, wherein the processor:
sets a target value of the response time as the target value of the performance, and
uses, as the target value, a value that is obtained by normalizing the target value that is set in terms of the data size and the cache hit rate.

12. The storage management device according to claim 11, wherein the processor normalizes the target value by using a formula of:

$$\left[\frac{\text{MEASURE DATA SIZE}}{\text{REFERENCE DATA SIZE}} \times (\text{TARGET RESPONSE TIME} - \text{CONSTANT 1})\right] + [\text{CONSTANT 1} \times \{\text{MEASURED CACHE HIT RATE} \times \text{CONSTANT 2} + (1 - \text{MEASURED CACHE HIT RATE})\}].$$

13. A control method of a storage system that includes a storage management device and a storage apparatus, the control method, performed by the storage management device, comprising:
storing, in a memory, a procedure including executable instructions and a setting information of all of a plurality of storage units that are included in the storage apparatus in which data is sent and received via transmission resources;
registering, in the setting information, a target value of the performance set to some or all of the storage units;
selecting one storage unit of which the target value is registered in the setting information among all of the storage units;
monitoring, the load factor of the transmission resources;
selecting one resource based on the load factor among the transmission resources that are used by the selected one storage unit;
specifying sharing storage units that share the selected one resource;
selecting a plurality of first storage units of which the target value is registered in the setting information from the sharing storage units;
reserving adjustment of a bandwidth in the first storage units and second storage units of which the target values are not registered in the setting information among the sharing storage units based on differences between the target value and a measured performance of the storage unit;
deciding, based on reservation of the adjustment of the bandwidth, bandwidth allocation of the sharing storage units; and
adjusting, performed by the storage apparatus, the bandwidth of the storage units in accordance with the bandwidth allocation decided by the storage management device.

14. A non-transitory computer-readable recording medium having stored therein a control program for a storage management device that manages a storage apparatus in which storage units are included and data is sent and received via transmission resources, the control program causing a computer to execute a process comprising:
storing in a memory, a procedure including executable instructions and a setting information of all of the storage units;
registering, in the setting information, a target value of the performance set to some or all of the storage units;
selecting one storage unit of which the target value is registered in the setting information among all of the storage units;
monitoring the load factor of the transmission resources;
selecting one resource based on the load factor among the transmission resources that are used by the selected one storage unit;
specifying sharing storage units that share the selected one resource;
selecting a plurality of first storage unit of which the target value is registered in the setting information from the sharing storage units;
reserving adjustment of a bandwidth in the first storage units and second storage units of which the target values are not registered in the setting information among the sharing storage units based on differences between the target value and a measured performance of the storage unit;
deciding, based on reservation of the adjustment of the bandwidth, bandwidth allocation of the sharing storage units; and
adjusting the bandwidth of the storage units in accordance with the bandwidth allocation decided at the deciding.

15. A storage management device that manages a storage apparatus in which a plurality of storage units are included and data is sent and received via transmission resources, the storage units being grouped into management groups in each of which the bandwidth is changed by a single instruction, from the processor, to adjust the bandwidth, the storage management device comprising:

a memory that stores a procedure including executable instructions; and a processor coupled to the memory, the processor executing the procedure including:

setting a target value of performance to some or all of the storage units;

monitoring a load factor of the transmission resources;

specifying a target transmission resource based on the load factor of the transmission resources;

extracting the storage unit on which adjustment of a bandwidth to be performed based on differences between the target value and a measured performance of the storage units in each of which the target value is set and which use the specified transmission resource;

deciding, based on the target value, bandwidth allocation of some of the extracted storage units; and adjusting, based on the decided bandwidth allocation, the bandwidth of each of the storage units included in a predetermined number of groups in the order of the groups in which the total sum of the differences between the target value and the measured performance of the storage units in each of which the target value is set and that is included in one of the management groups is large.

\* \* \* \* \*